United States Patent
Saito et al.

(10) Patent No.: US 7,024,504 B2
(45) Date of Patent: Apr. 4, 2006

(54) DATA TRANSFER CONTROL DEVICE, ELECTRONIC EQUIPMENT AND DATA TRANSFER CONTROL METHOD

(75) Inventors: Nobuyuki Saito, Sapporo (JP); Shun Oshita, Sapporo (JP); Shinsuke Kubota, Sapporo (JP); Kuniaki Matsuda, Sapporo (JP); Kenyou Nagao, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 10/376,548

(22) Filed: Mar. 4, 2003

(65) Prior Publication Data

US 2003/0204652 A1    Oct. 30, 2003

(30) Foreign Application Priority Data

Apr. 26, 2002    (JP)    ............................. 2002-127119

(51) Int. Cl.
G06F 13/00    (2006.01)
(52) U.S. Cl. ...................................... 710/110; 710/305
(58) Field of Classification Search ................. 710/62, 710/63, 100, 110, 300, 305, 306, 313
See application file for complete search history.

(56) References Cited

U.S. PATENT DOCUMENTS 5,784,581 A *   7/1998  Hannah ...................... 710/110
6,105,097 A     8/2000  Larky et al.
6,141,719 A *  10/2000  Rafferty et al. ............. 710/316
6,516,205 B1 *  2/2003  Oguma ........................ 455/557
6,802,018 B1 * 10/2004  Bormann et al. ........... 713/324

FOREIGN PATENT DOCUMENTS

| JP | A-04-270414 | 9/1992 |
| JP | A-10-301899 | 11/1998 |
| JP | A-2001-175586 | 6/2001 |
| JP | A-2001-306496 | 11/2001 |
| JP | A-2002-055936 | 2/2002 |

OTHER PUBLICATIONS

Wikipedia, Definition of the Register.*
Saito, "OTG Controller LSI Taking Reduction of CPU Load Into Consideration", Design Wave Magazine, Apr. 2002, pp. 82-88.
U.S. Appl. No. 10/379,727, filed Mar. 6, 2003, Saito et al.
U.S. Appl. No. 10/379,686, filed Mar. 6, 2003, Saito et al.
U.S. Appl. No. 10/379,592, filed Mar. 6, 2003, Saito et al.
Zong Liang WU; "USB On-The-Go: Implementation"; Nov. 9, 2001; pp. 1-25.

* cited by examiner

Primary Examiner—Khanh Dang
(74) Attorney, Agent, or Firm—Oliff & Berridge, PLC

(57) ABSTRACT

A signal state detection circuit of a data transfer control device notifies a processing of results detected by a line state detection circuit or a power supply line detection circuit by using an interrupt signal. The processing sets a state command corresponding to a state of a transition destination judged based on the notified detection results in a control register of a state controller. A state command decoder decodes the state command set in the control register and generates a control signal. A signal line control circuit controls a signal state of at least one of signal lines formed of data signal lines (D+ and D−) and power supply lines (VBUS and GND) based on the control signal.

18 Claims, 19 Drawing Sheets

FIG. 1A
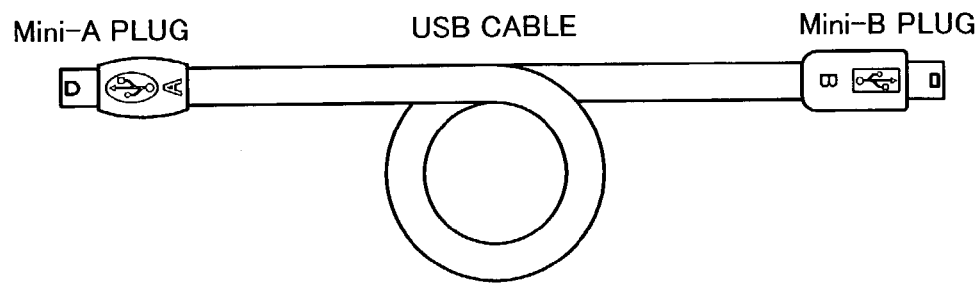
FIG. 1B
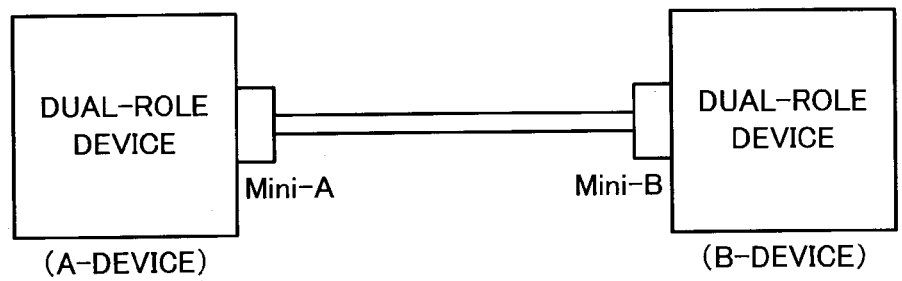
FIG. 1C
| TERMINAL NUMBER | SIGNAL NAME |
|---|---|
| 1 | VBUS |
| 2 | D− |
| 3 | D+ |
| 4 | ID |
| 5 | GND |

FIG. 14

| REGISTER | bit7 | bit6 | bit5 | bit4 | bit3 | bit2 | bit1 | bit0 |
|---|---|---|---|---|---|---|---|---|
| MONITOR REGISTER | LSConnect | ID | LineState[1:0] | | | | Comp20V | Comp44V |
| CONTROL REGISTER | AllowRmtWkup | | | BusPwrSel | OTGStateCmd[3:0] | | | |

DATA TRANSFER CONTROL DEVICE, ELECTRONIC EQUIPMENT AND DATA TRANSFER CONTROL METHOD

Japanese Patent Application No. 2002-127119 filed on Apr. 26, 2002, is hereby incorporated by reference in its entirety.

BACKGROUND OF THE INVENTION

The present invention relates to a data transfer control device, electronic equipment, and a data transfer control method.

In recent years, the USB (Universal Serial Bus) standard has attracted attention as an interface standard for connecting a personal computer with a peripheral device (electronic equipment in a broad sense). However, data transfer according to the USB standard cannot be performed between peripheral devices without an intermediate host. Therefore, the "USB On-The-Go (OTG) 1.0" standard (hereinafter abbreviated as "OTG standard") has been provided as a supplemental standard to the USB 2.0 standard, and has enabled data transfer according to the USB standard to be performed between peripheral devices.

In the OTG standard, a peripheral which operates as a device in the USB standard is allowed to have a host function necessary for operating as a host. This enables peripheral devices, which are devices in the conventional USB standard, to be connected, whereby data can be transferred without an intermediate host in the conventional USB standard.

BRIEF SUMMARY OF THE INVENTION

One aspect of the present invention relates to a data transfer control device including a controller which performs operation control of a host function and a peripheral function by transitioning between a plurality of states, the data transfer control device comprising:

a control register in which a state command corresponding to each state for controlling the controller is set;

a signal state detection circuit which detects a signal state of at least one of data lines and power supply line; and a state command decoder which decodes the state command and generates a control signal which controls the signal state of at least one of the data lines and power supply line, wherein a state command corresponding to a state of a transition destination generated by a given processing section based on a result detected by the signal state detection circuit is set in the control register.

BRIEF DESCRIPTION OF THE SEVERAL VIEWS OF THE DRAWING

FIG. 1A is a schematic view showing an outline of a USB cable having a Mini-A plug and a Mini-B plug on opposite ends;

FIG. 1B is an illustrative of an A-device and a B-device; and

FIG. 1C shows a terminal table.

FIG. 14 is an explanatory diagram showing an example of a register map of an OTG controller.

DETAILED DESCRIPTION OF THE EMBODIMENT

Figure 2:
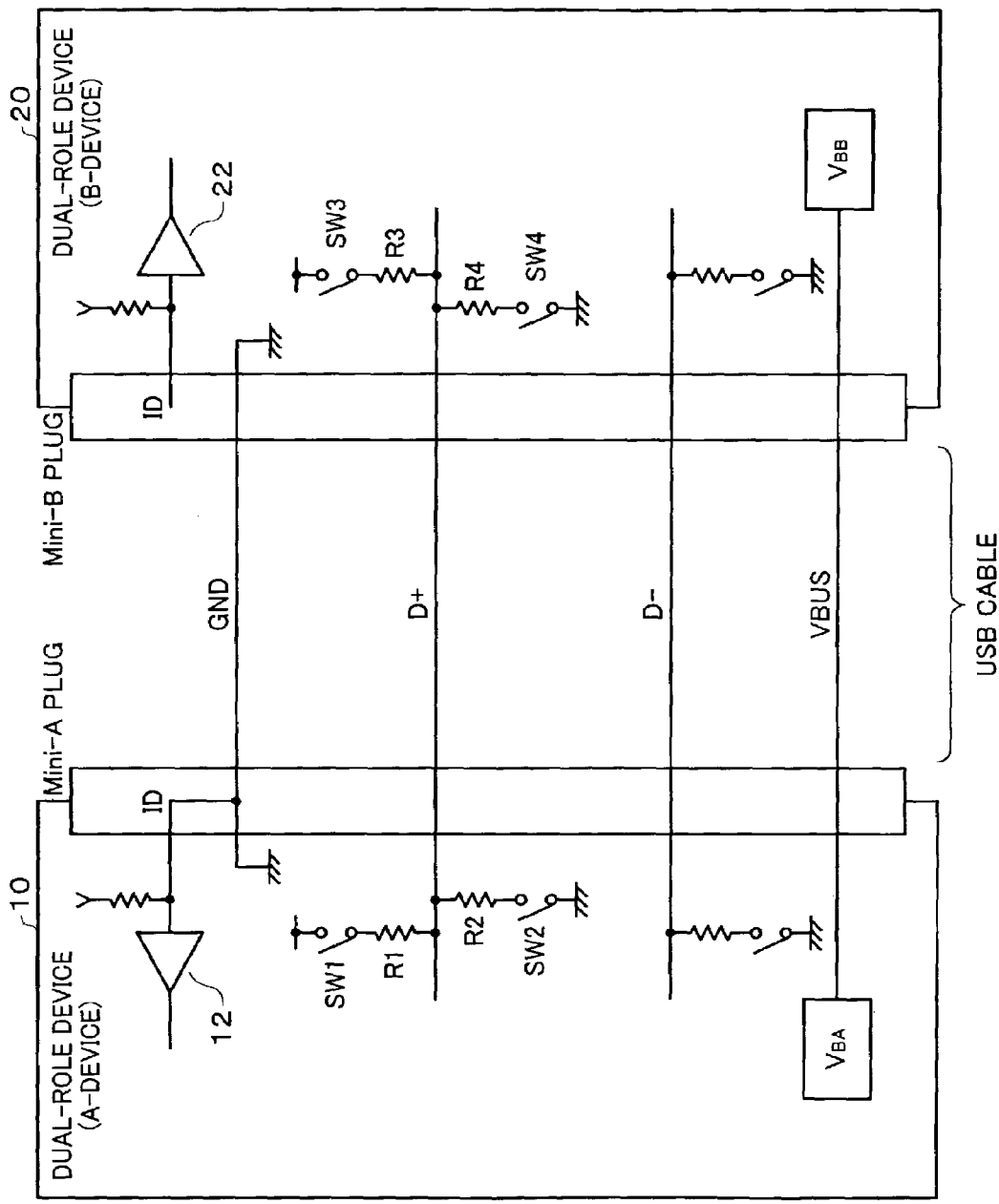
FIG. 2 schematically shows an example of dual-role devices to which a USB cable is connected.

Embodiments of the present invention are described below. Note that the embodiments described hereunder do not in any way limit the scope of the invention defined by the claims laid out herein. Note also that all of the elements described below should not be taken as essential requirement to the present invention.

The OTG standard defines a dual-role device. The dual-role device can operate as either a host or a peripheral. The dual-role device is controlled by state transition defined in the OTG standard, for example. A number of states are defined in the OTG standard and generation or detection of a signal state must be controlled corresponding to each state.

If the state transition is controlled only by using software (firmware), detection, and the like, of the signal state for each state must be controlled by software (firmware). This makes it necessary for the CPU to manage the entire OTG control including the lowest-level control, whereby the software (firmware) design becomes complicated. If the state transition is controlled only by using hardware, flexibility of design changes is decreased. Moreover, since a millisecond (ms) timer circuit is necessary, the circuit scale is increased.

According to the following embodiments, a data transfer control device, electronic equipment, and a data transfer control method capable of optimizing state transition control in the case of transitioning between a plurality of states such as a host function and a peripheral function of the OTG standard can be provided.

One embodiment of the present invention relates to a data transfer control device including a controller which performs operation control of a host function and a peripheral function by transitioning between a plurality of states, the data transfer control device comprising:

a control register in which a state command corresponding to each state for controlling the controller is set;

a signal state detection circuit which detects a signal state of at least one of data lines and power supply line; and a state command decoder which decodes the state command and generates a control signal which controls the signal state of at least one of the data lines and power supply line, wherein a state command corresponding to a state of a transition destination generated by a given processing section based on a result detected by the signal state detection circuit is set in the control register.

The host function used herein refers to the function of controlling data transfer as a master side to and from a device having the peripheral function, such as the USB host function defined in the USB 2.0 standard. The peripheral function used herein refers to the function of performing data transfer as a slave side to and from a device having the host function in response to a request from the device having the host function, such as the USB device function defined in the USB 2.0 standard.

The processing section may be realized by allowing a CPU to read the contents of software or firmware, for example.

In this data transfer control device, the signal state is detected by the signal state detection circuit and the processing section controls transition between the states by using the detected results as a transition condition. The processing section sets a state command corresponding to a state of a transition destination in the control register. The state command decoder decodes the state command set in the control register and generates a control signal. The control signal is capable of controlling the signal state, for example. This eliminates the need to manage the entire data transfer control including the lowest-level control, whereby software (firmware) can be simplified in comparison with the case of controlling state transition only by using software (firmware). Moreover, an increase in circuit scale can be prevented in comparison with the case of controlling state transition only by using hardware. Therefore, since it suffices to decode the set state command, the processing section can be simplified and an increase in circuit scale can be prevented, whereby transition control between a plurality of states necessary for the data transfer control device can be optimized.

In this data transfer control device, the given processing section may start counting a given time-out period in a state corresponding to a first state command set in the control register, and may set a state command corresponding to a state transitioning corresponding to a result detected by the signal state detection circuit in the control register when the given time-out period has elapsed.

According to this data transfer control device, even if it is necessary to measure a time-out period, state transition can be controlled while allowing firmware to execute a timer function in the state corresponding to the first state command, whereby state control can be optimized while preventing an increase in circuit scale.

In this data transfer control device, the first state command may be a state command corresponding to a state which is transitioned from an idle state and waits until voltage of the power supply line reaches a given threshold voltage.

According to this data transfer control device, state control can be simplified even if the time-out period which must be measured until the voltage of the power supply line reaches the given threshold voltage is a millisecond or more.

In this data transfer control device, the signal state detection circuit may includes:

a data line detection circuit which detects the signal state of the data lines; and a power supply line detection circuit which detects the signal state of the power supply line, and at least one of the data line detection circuit and the power supply line detection circuit may change the signal state to be detected depending on the state command set in the control register.

According to this data transfer control device, state transition control by the firmware can be optimized without increasing the load of the firmware, by changing the detection condition depending on the state transitioned corresponding to the line state and the power supply line state.

This data transfer control device may further comprise a state generating circuit which generates a state command corresponding to a state next to a state corresponding to a state command set in the control register, and a state command corresponding to a state of the transition destination generated by the given processing section or a state command generated by the state generating circuit may be set in the control register.

According to this data transfer control device, state transition which cannot be controlled in time by firmware processing can be controlled by hardware. In order to simplify control by maintaining consistency of state transition control, it is preferable to allow the firmware to perform state transition by using the same transition condition and to set a state command corresponding to a state of the same transition destination after setting by the hardware.

In this data transfer control device, the state generating circuit may generate a state command corresponding to a state which is transitioned from a suspend state and starts data transfer.

According to this data transfer control device, it is possible to deal with transition control to a state which cannot be processed by the firmware since a bus drive start time is limited in order to perform data transfer.

In this data transfer control device, the controller may control switching between the host function and the peripheral function according to the Universal Serial Bus (USB) On-The-Go (OTG) standard.

This data transfer control device can be applied for controlling a dual-role device of the OTG standard. This enables USB transfer to be performed between peripherals.

Electronic equipment according to one embodiment of the present invention comprises the above data transfer control device, and a device which performs output processing, fetch processing, or storage processing of data transferred through the data transfer control device and a bus.

According to this embodiment, electronic equipment capable of reducing the load of software (firmware) and performing data transfer in which the host function and the peripheral function can be switched can be provided.

Another embodiment of the present invention relates to a data transfer control method for a controller which performs operation control of a host function and a peripheral function by transitioning between a plurality of states, the data transfer control method comprising:

detecting a signal state of at least one of data lines and power supply line;

allowing a given processing section to judge a state of a transition destination based on a result detected for the signal state and to set a state command corresponding to the state of the transition destination; and controlling the signal state of at least one of the data lines and power supply line based on the state command.

In this data transfer control method, the processing section controls transition between the states by using the results detected for the signal state as a transition condition. A control signal is generated by decoding the state command corresponding to the state of a transition destination. The control signal is capable of controlling the signal state, for example. This eliminates the need to manage the entire data transfer control including the lowest-level control, whereby the software (firmware) can be simplified in comparison with the case of controlling state transition only by using software (firmware). Moreover, an increase in circuit scale can be prevented in comparison with the case of controlling state transition only by using hardware. Therefore, since it suffices to decode the set state command, the processing section can be simplified and an increase in circuit scale can be prevented, whereby transition control between a plurality of states can be optimized.

In this data transfer control method, the given processing section may start counting a given time-out period in a state corresponding to a first state command, and may allow transition to a state corresponding to the result detected for the signal state when the given time-out period has elapsed.

According to this data transfer control method, even if it is necessary to measure a time-out period, state transition can be controlled while allowing firmware to execute a timer function in the state corresponding to the first state command, whereby state control can be optimized while preventing an increase in circuit scale.

In this data transfer control method, the first state command may be a state command corresponding to a state which is transitioned from an idle state and waits until voltage of the power supply line reaches a given threshold voltage.

According to this data transfer control method, state control can be simplified even if the time-out period which must be measured until the voltage of the power supply line reaches the given threshold voltage is a millisecond or more.

In this data transfer control method, the signal state to be detected of at least one of the data lines and power supply line may be changed according to the state command.

According to this data transfer control method, state transition control of the firmware can be optimized without increasing the load of the firmware by changing the detection condition depending on the state transitioned corresponding to the line state and the power supply line state.

In this data transfer control method, the controller may control switching between the host function and the peripheral function according to the Universal Serial Bus (USB) On-The-Go (OTG) standard.

This data transfer control method can be applied for controlling a dual-role device of the OTG standard. This enables USB transfer to be performed between peripherals.

The embodiments of the present invention are described below in detail with reference to the drawings.

1. OTG (On-The-Go) Standard 1.1 A-Device and B-Device

The OTG standard is briefly described below.

The USB (Universal Serial Bus) standard is a standard for transferring data between a host (personal computer, for example) and one or more peripherals (peripheral devices, for example). Data transfer is controlled by the host. The amount of data processed in portable equipment and the like which are peripherals in the USB standard has been increased. Therefore, a demand for transferring data according to the USB standard without an intermediate host while consuming only a small amount of power has been increased.

In view of such a situation, the OTG standard has been provided as a supplemental standard to the USB 2.0 standard. In the OTG standard, small-sized connectors, a dual-role device which allows a peripheral to have a host function necessary for operating as a host, and the like are newly standardized.

In the case of performing data transfer according to the OTG standard, a host and a peripheral are connected by a USB cable to which a Mini-A plug and a Mini-B plug are provided on opposite ends, as shown in FIG. 1A. The Mini-A plug has a structure which allows insertion into a Mini-A receptacle or a Mini-AB receptacle. The Mini-B plug has a structure which allows insertion into a Mini-B receptacle or a Mini-AB receptacle. A dual-role device must be equipped with a Mini-AB receptacle.

In the USB standard, a host and a peripheral can be connected only by using VBUS (power supply), GND (ground), and two data signal lines (D+ and D−). VBUS is supplied from the host. The data signal lines D+ and D− used as differential signal lines.

In the OTG standard, a dual-role device to which a Mini-A plug is connected becomes an A-device, as shown in FIG. 1B. The A-device operates as the host at the start of a session and is capable of transferring the host function to a B-device under given conditions. A dual-role device to which a Mini-B plug is connected becomes a B-device. The B-device operates as the peripheral at the start of a session and is allowed to operate as the host by the A-device. The A-device supplies VBUS.

In the dual-role device, an ID terminal is defined in addition to the conventional terminals (VBUS, D−, D+, and GND) of the connector in order to detect the type of plug inserted into the Mini-AB receptacle, as shown in FIG. 1C. The ID terminal is connected with GND in the Mini-A plug and the ID terminal is in an open state in the Mini-B plug.

FIG. 2 schematically shows an example of dual-role devices to which a USB cable is connected.

A dual-role device 10 to which a Mini-A plug is connected and a dual-role device 20 to which a Mini-B plug is connected are connected through a USB cable. The dual-role devices 10 and 20 include ID detection circuits 12 and 22, respectively. Each of the ID detection circuits 12 and 22 pulls up a signal line electrically connected with the ID terminal and detects whether or not the ID terminal is grounded depending on the voltage of the signal line. The ID detection circuit 12 shown in FIG. 2 detects a Mini-A plug since the signal line connected with the ID terminal is grounded. The ID detection circuit 22 detects a Mini-B plug since the signal line connected with the ID terminal is pulled up.

The dual-role device 10 includes a pull-up resistor R1 for pulling up the data signal line D+ and a pull-down resistor R2 for pulling down the data signal line D+ in order to operate as either the host or the peripheral. The pull-up resistor R1 is connected with a power supply voltage line through a switch circuit SW1 for turning the pull-up on/off. The pull-down resistor R2 is connected with a ground line through a switch circuit SW2 for turning the pull-down on/off. The switch circuits SW1 and SW2 are controlled exclusively so that one of the switch circuits SW1 and SW2 is turned off when the other is turned on.

The dual-role device 20 includes a pull-up resistor R3 for pulling up the data signal line D+ and a pull-down resistor R4 for pulling down the data signal line D+. The pull-up resistor R3 is connected with a power supply voltage line through a switch circuit SW3 for turning the pull-up on/off. The pull-down resistor R4 is connected with a ground line through a switch circuit SW4 for turning the pull-down on/off. The switch circuits SW3 and SW4 are controlled exclusively so that one of the switch circuits SW3 and SW4 is turned off when the other is turned on.

In the dual-role devices 10 and 20, the data signal line D– is pulled low.

Since both the dual-role devices 10 and 20 can become the A-device, the dual-role devices 10 and 20 respectively include power supply control circuits VBA and VBB which supply current to VBUS. In FIG. 2, the dual-role device 10 supplies current to VBUS by the power supply control circuit VBA.

1.2 SRP (Session Request Protocol)

In the OTG standard, the A-device can suspend supply of current to VBUS when there is no bus activity. Therefore, unnecessary power consumption can be reduced if battery-powered portable equipment operates as the host, whereby power consumption can be reduced. In the case where the B-device starts a session in this state and transfers data, the B-device can request the A-device to supply current to VBUS according to the procedure called SRP. The session used herein refers to a period in which the voltage of VBUS is above a given threshold voltage.

Figure 3:
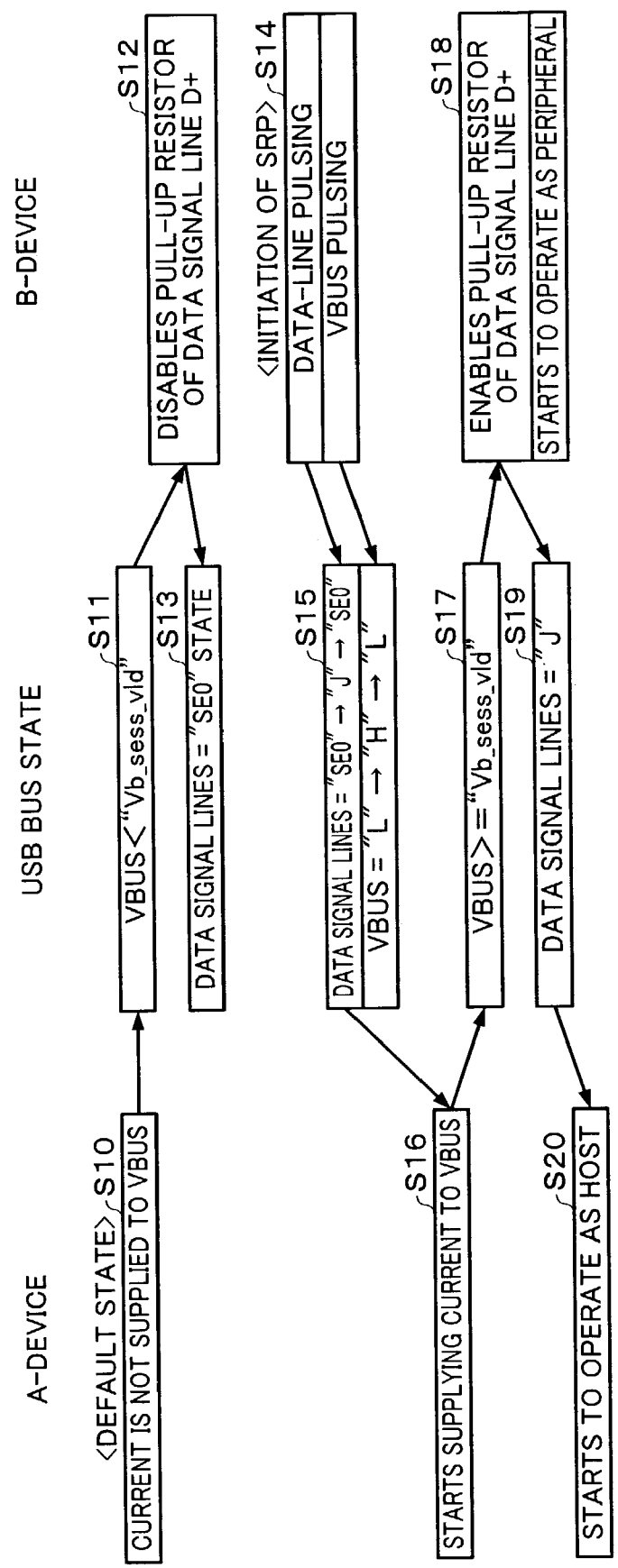
FIG. 3 is an illustrative of SRP.

FIG. 3 is a view illustrating the procedure for SRP in the FS (Full Speed) mode with reference to the configuration of the dual-role devices shown in FIG. 2.

In the FS mode, the data signal line D+ is pulled down in the host (switch circuit SW1 is turned off and switch circuit SW2 is turned on), and the data signal line D+ is pulled up in the peripheral (switch circuit SW3 is turned on and switch circuit SW4 is turned off).

When there is no bus activity and the A-device suspends supply of current to VBUS (S10), the voltage of VBUS drops below a "Vb_sess_vld" (B-DeviceSession Valid) level (S11). When the B-device detects that the voltage of VBUS drops below the "Vb_sess_vld" level, the B-device disables the pull-up resistor of the data signal line D+ by the switch circuit SW3 (S12). This allows the line state of the data signal lines to be in an "SE0" state (data signal line D+ is at "L" level and data signal line D– is at "L" level in the FS mode) (S13).

If the voltage of VBUS is lower than "Vb_sess_end" (B-Device Session End) and the "SE0" state continues for 2 ms or more, the B-device can initiate SRP. SRP can be performed by data-line pulsing or VBUS pulsing. The data-line pulsing is a method which causes the line state to transition to the "SE0" state, a "J" state (data signal line D+ is at "H" level and data signal line D– is at "L" level in the FS mode), and the "SE0" state in that order. The VBUS pulsing is a method which causes the voltage of VBUS to transition to an "L" level (less than Vb_sess_end), an "H" level (higher than Va_sess_vld) and the "L" level in that order by allowing the B-device to supply current to VBUS (S14 and S15).

When the A-device detects that SRP is performed by either method by monitoring the voltages of the data signal lines or VBUS, the A-device starts supplying current to VBUS (S16). This allows the voltage of VBUS to be equal to or above "Vb_sess_vld" (S17).

When the B-device detects that the voltage of VBUS is equal to or above "Vb_sess_vld", the B-device enables the pull-up resistor of the data signal line D+ by the switch circuit SW3 (S18) to allow the line state to transition to the "J" state (S19), and starts to operate as the peripheral.

When the A-device detects that the line state is in the "J" state, the A-device starts to operate as the host (S20).

1.3 HNP (Host Negotiation Protocol)

In the OTG standard, a dual-role device becomes either the A-device or the B-device depending on the plug connected thereto. However, the host function and the peripheral function can be exchanged without plugging or unplugging. HNP is a procedure for exchanging the host function and the peripheral function.

Figure 4:
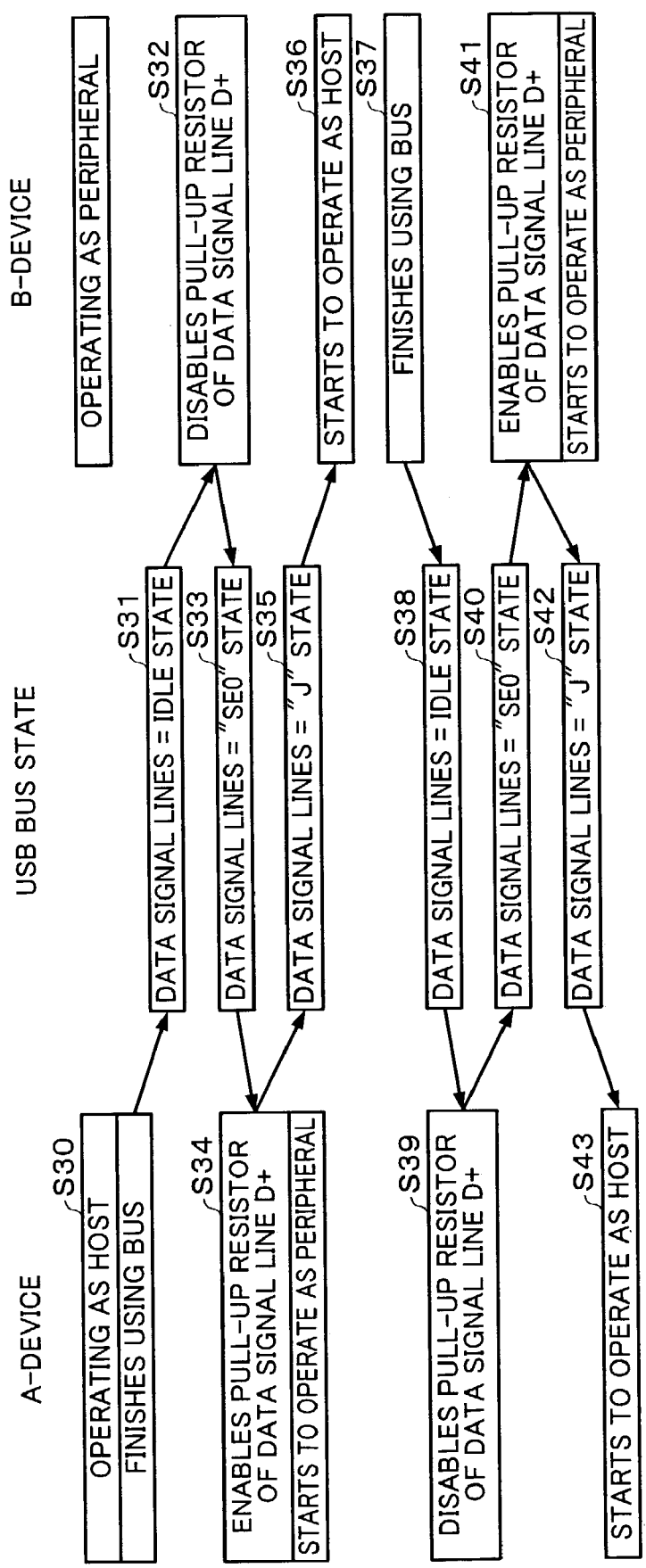
FIG. 4 is an illustrative of HNP.

FIG. 4 is a view illustrating the procedure for HNP in the FS mode with reference to the configuration of the dual-role devices shown in FIG. 2.

The following description is given on the assumption that the A-device operates as the host, the B-device operates as the peripheral, and HNP is enabled.

When the A-device finishes using the bus (S30), the A-device puts the line state in an idle state ("J" state in the FS mode) (S31).

When the B-device detects that the "J" state continues for 3 ms or more, the B-device disables the pull-up resistor of the data signal line D+ by the switch circuit SW3 (S32) to allow the line state to be in the "SE0" state (S33). When the A-device detects that the line state is in the "SE0" state, the A-device enables the pull-up resistor (disables the pull-down resistor) of the data signal line D+ by the switch circuit SW1 (S34). This allows the line state to be in the "J" state (S35), whereby the A-device starts to operate as the peripheral. The B-device detects that the line state is in the "J" state and starts to operate as the host (S36).

When the B-device as the host finishes using the bus (S37), the B-device allows the line state to be in the idle state by the switch circuits SW3 and SW4 (S38). The A-device detects that the line state is in the idle state and disables the pull-up resistor of the data signal line D+ (S39) to allow the line state to transition to the "SE0" state (S40). When the B-device detects that the line state is in the "SE0" state, the B-device enables the pull-up resistor (disables the pull-down resistor) of the data signal line D+ by the switch circuit SW3 (S41). This allows the line state to be in the "J" state (S42), whereby the B-device starts to operate as the peripheral. The A-device detects that the line state is in the "J" state and starts to operate as the host (S43).

Data transfer control by using such a protocol can be realized by allowing the A-device and the B-device to transition between states which specify each state according to a transition condition.

The state transition of the A-device and the B-device is described below.

1.4 State Transition of A-Device

Figure 5:
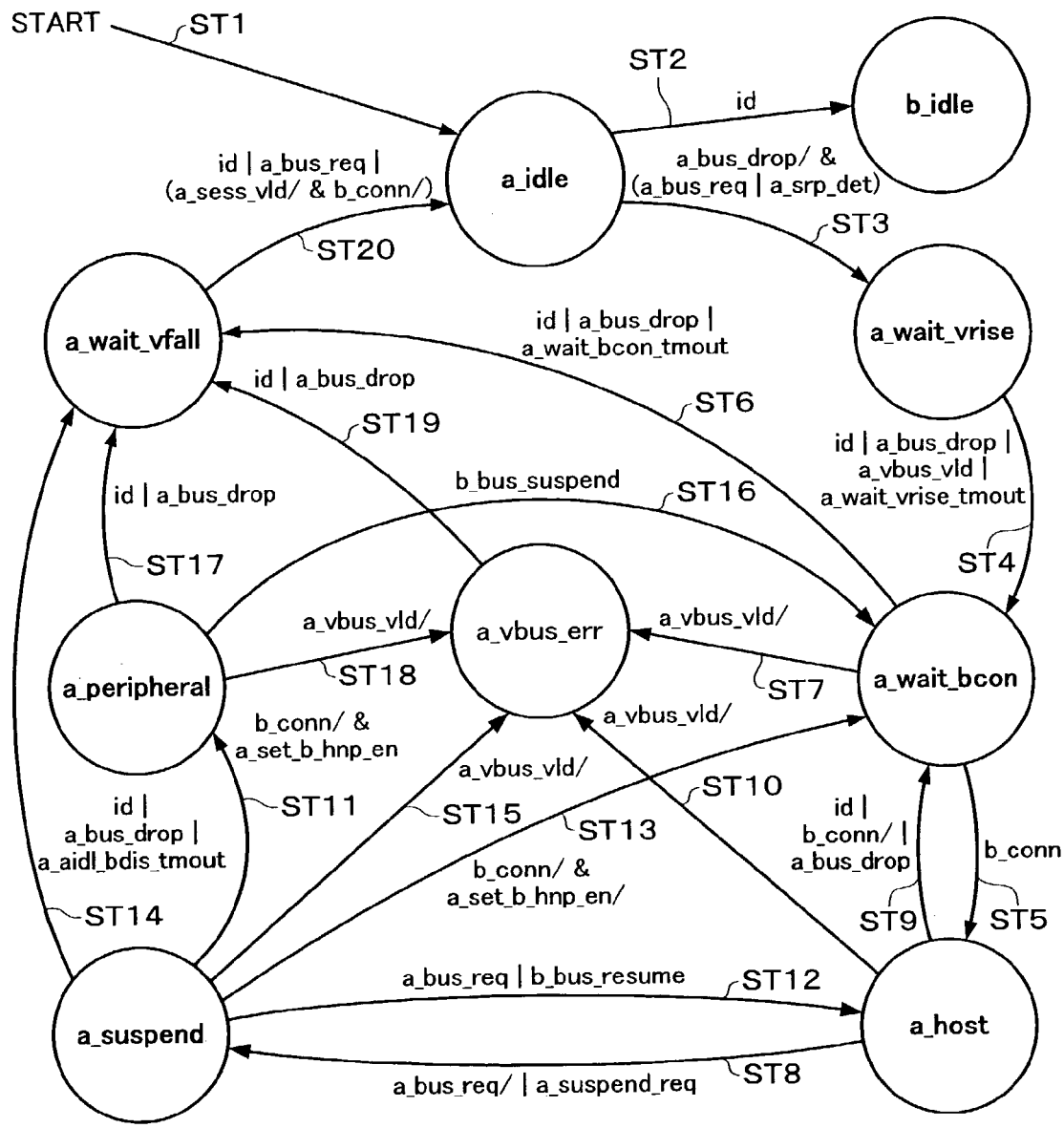
FIG. 5 is an illustrative of state transition of an A-device.

FIG. 5 is a view illustrating state transition of the A-device.

The a_idle state is the start state for the A-device (ST1).

If a Mini-A plug of the USB cable is not inserted into the Mini-AB receptacle of the dual-role device, the pulled-up ID terminal is at the "H" level (id), whereby the dual-role device transitions to the b_idle state (ST2). Specifically, the dual-role device defaults to a B-device. If a Mini-A plug is inserted, the ID terminal is at the "L" level (id/), whereby the dual-role device transitions to the a_idle state (ST1).

Supply of current to VBUS is suspended in the a_idle state. The pull-up of the data signal line D+ is disabled (turned off) (pull-down is enabled; in more detail, switch circuit SW1 is turned off and switch circuit SW2 is turned on). Therefore, the line state is in the "SE0" state. If the host application does not request dropping the voltage of VBUS (a_bus_drop/), and if the A-device wants to perform USB transfer (a_bus_req) or detects SRP from the B-device (a_srp_det), the A-device transitions to the a_wait-vrise state (ST3).

In the a_wait_vrise state, current starts to be supplied to VBUS and the voltage of VBUS rises. If the Mini-A plug is removed (id), if the host application requests dropping the voltage of VBUS (a_bus_drop), if the voltage of VBUS exceeds a given threshold voltage (a_vbus_vld), or if a predetermined period of time has elapsed in the a_wait_vrise state (a_wait_vrise_tmout), the A-device transitions to the a_wait_bcon state (ST4).

In the a_wait_bcon state, the pull-up of the data signal line D+ in the A-device is in an off state. If the pull-up of the data signal line D+ is enabled (turned on) by the B-device (switch circuit SW3 is turned on and switch circuit SW4 is turned off) to allow the data signal line D+ to be at the "H" level (line state is in the "J" state) (b_conn), the A-device transitions to the a_host state (ST5). If the Mini-A plug is removed (id), if the host application requests dropping the voltage of VBUS (a_bus_drop), or if a predetermined period of time has elapsed in the a_wait_bcon state (a_wait_b-con_tmout), the A-device transitions to the a_wait_vfall state (ST6). If the voltage of VBUS drops below the given threshold voltage (a_vbus_vld/), the A-device transitions to the a_vbus_err state (ST7).

Specifically, since the dual-role device defaults to a B-device, the data signal line D+ remains pulled down in the A-device until the a_wait_bcon state. When current starts to be supplied to VBUS in the a_wait_vrise state, the pull-up of the B-device is turned on. This allows the A-device in which the data signal line D+ is pulled down to operate as the host, and the B-device in which the data signal line D+ is pulled up to operate as the peripheral.

In the a_host state, the A-device operates as the host of the USB standard. In more detail, the A-device drives the data signal lines into the "SE0" state as a bus reset signal in order to enumerate the peripheral as the host. The peripheral is reset by allowing this state to continue for a given period of time. The host transfers configuration information, assigns an address, and the like by using control transfer, and starts USB transfer. In the a_host state, if the A-device as the host finishes using the bus (a_bus_req/), or if transition to the suspend state is requested (a_suspend_req), the A-device transitions to the a_suspend state (ST8). If the Mini-A plug is removed (id), if the line state changed to the "SE0" state from the "J" state (b_conn/), or if the host application requests dropping the voltage of VBUS (a_bus_drop), the A-device transitions to the a_wait_bcon state (ST9). If the voltage of VBUS drops below the given threshold voltage (a_vbus_vld/) for some reason, the A-device transitions to the a_vbus_err state (ST10).

In the a_suspend state, issuance of SOF (Start Of Frame) packets is suspended. The B-device operates as the peripheral and remains in the b_peripheral state. If the A-device enables HNP by the B-device (a_set_b_hnp_en), and the pull-up is turned off in the B-device to put the line state in the "SE0" state (b_conn/), the A-device transitions to the a_peripheral state (ST 11). If the A-device wants to use the bus (a_bus_req), or if the B-device puts the line state in the "K" state (b_bus_resume), the A-device transitions to the a_host state (ST12). If the A-device disables HNP by the B-device (a_set_b_hnp_en/), and the pull-up is turned off in the B-device to put the line state in the "SE0" state (b_conn/), the A-device transitions to the a_wait_bcon state (ST13). If the Mini-Aplug is removed (id), if the host application requests dropping the voltage of VBUS (a_bus_drop), or if a predetermined period of time has elapsed in the a_suspend state (a_aidl_bdis_tmout), the A-device transitions to the a_wait_vfall state (ST14). If the voltage of VBUS drops below the given threshold voltage (a_vbus_vld/) for some reason, the A-device transitions to the a_vbus-err state (ST15).

In the a_peripheral state, since the pull-up is turned on in the A-device and the pull-up is turned off in the B-device by HNP enable from the A-device as described later, the A-device becomes the peripheral and the B-device becomes the host. If the B-device finishes using the bus such as in the case where the B-device as the host finishes data transfer (b_bus_suspend), the A-device transitions to the a_wait_b-con state (ST16). In the a_wait_bcon state, the pull-up of the A-device is turned off as described above. In the a_peripheral state, if the Mini-A plug is removed (id), or if the host application requests dropping the voltage of VBUS (a_bus_drop), the A-device transitions to the a_wait_vfall state (ST17). If the voltage of VBUS drops below the given threshold voltage (a_vbus_vld/) for some reason, the A-device transitions to the a_vbus_err state (ST18).

Since an overcurrent condition occurs in the a_bus_err state, firmware requests the A-device to drop the voltage of VBUS, for example. In the a_vbus_err state, if the Mini-A plug is removed (id), or if the host application requests dropping the voltage of VBUS (a_bus_drop), the A-device transitions to the a_wait_vfall state (ST19).

In the a_wait_vfall state, supply of current to VBUS is suspended. If the Mini-A plug is removed (id), if the A-device wants to use the bus (a_bus_req), or if the pull-up in the B-device is turned off in a state in which the voltage of VBUS is below the given threshold voltage (a_sess_vld/) to allow the line state to be in the "SE0" state (b_conn/), the A-device transitions to the a_idle state (ST20).

1.5 State Transition of B-Device

Figure 6:
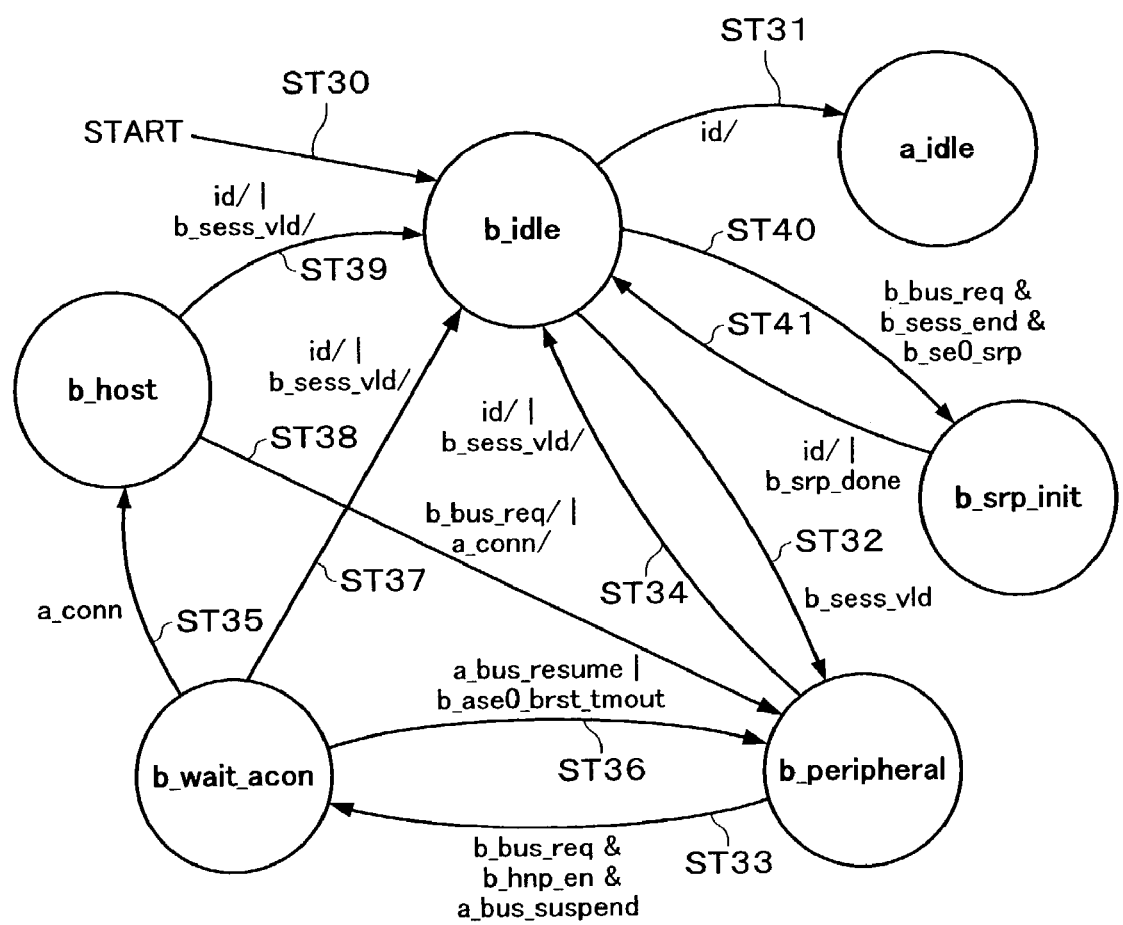
FIG. 6 is an illustrative of state transition of a B-device.

FIG. 6 is a view illustrating state transition of the B-device.

The b_idle state is the start state for the B-device (ST30).

In the b_idle state, supply of current to VBUS is suspended. Therefore, the voltage of VBUS is below the given threshold voltage. The pull-up of the data signal line D+ is turned off. If a Mini-A plug is inserted, since the ID terminal is at the "L" level (id/), the B-device transitions to the a_idle state (ST31). If the voltage of VBUS rises above the given threshold voltage (b_sess_vld), the B-device transitions to the b_peripheral state (ST32).

In the b_peripheral state, since the pull-up of the data signal line D+ is turned on, b_conn can be detected in the a_wait_bcon state of the A-device. In the b_peripheral state, the B-device operates as the peripheral in response to a request from the A-device. If the B-device detects that the A-device is in the a_suspend state (a_bus_suspend), the host application of the B-device requests the host operation (b_bus_req), and HNP is enabled by the A-device (b_h-np_en), the B-device transitions to the b_wait_acon state (ST33). In the b_peripheral state, if a Mini-A plug is inserted (id/), or if the voltage of VBUS drops below the given threshold voltage (b_sess_vld/), the B-device transitions to the b_idle state (ST34). As a result, the pull-up is turned off in the b_idle state, whereby the A-device transitions from the a_wait_vfall state to the a_idle state, for example.

In the b_wait_acon state, the B-device turns off the pull-up of the data signal line D+ and waits for the A-device to pull up the data signal line D+. If the pull-up of the data signal line D+ is turned on in the A-device (a_conn), the B-device transitions to the b_host state (ST35). In the b_wait_acon state, if the B-device detects that the A-device puts the line state in the "K" state (a_bus_resume), or if a predetermined period of time has elapsed in the b_wait_acon state (b_ase0_brst_tmout), the B-device transitions to the b_peripheral state (ST36). If a Mini-A plug is inserted (id/), or if the voltage of VBUS is below the given threshold voltage (b_sess_vld/), the B-device transitions to the b-idle state (ST37).

The host processing is performed in the b_host state. Specifically, the B-device resets the bus and starts generating SOF packets. The A-device responds to a request from the B-device which operates as the host. If the B-device completes data transfer as the host and finishes using the bus (b_bus_req/), or if the B-device detects that the pull-up is turned off in the A-device (a_conn/), the B-device transitions to the b_peripheral state (ST38). The A-device detects the b_peripheral state as the b_bus_suspend of the B-device, whereby the A-device transitions from the a_peripheral state to the a_wait_bcon state. As a result, the pull-up of the A-device is turned off. In the b_peripheral state, the pull-up of the B-device is turned on. In the b_host state, if a Mini-A plug is inserted (id/), or if the voltage of VBUS is below the given threshold voltage (b_sess_vld/), the B-device transitions to the b_idle state (ST39).

The B-device requests start of a session by SRP when the A-device is in the suspend state. Specifically, if the host application of the B-device requests use of the bus (b_bus_req), the voltage of VBUS is below a session end threshold voltage of the B-device (b_sess_end), and a predetermined period of time has elapsed in a state in which the line state is in the "SE0" state (b_se0_srp), the B-device transitions to the b_srp_init state (ST40).

In the b_srp_init state, the B-device requests the A-device to start a session by SRP. If the B-device completes SRP (b_srp_done), or if a Mini-A plug is inserted (id/), the B-device transitions to the b_idle state (ST41).

2. Description of Present Embodiment

The data transfer control device in the present embodiment realizes the operation as the dual-role device by using the above-described state transition. Specifically, the data transfer control device is capable of controlling USB transfer as the A-device or the B-device while switching the host function and the peripheral function.

The following description is given taking the FS mode as an example.

Figure 7:
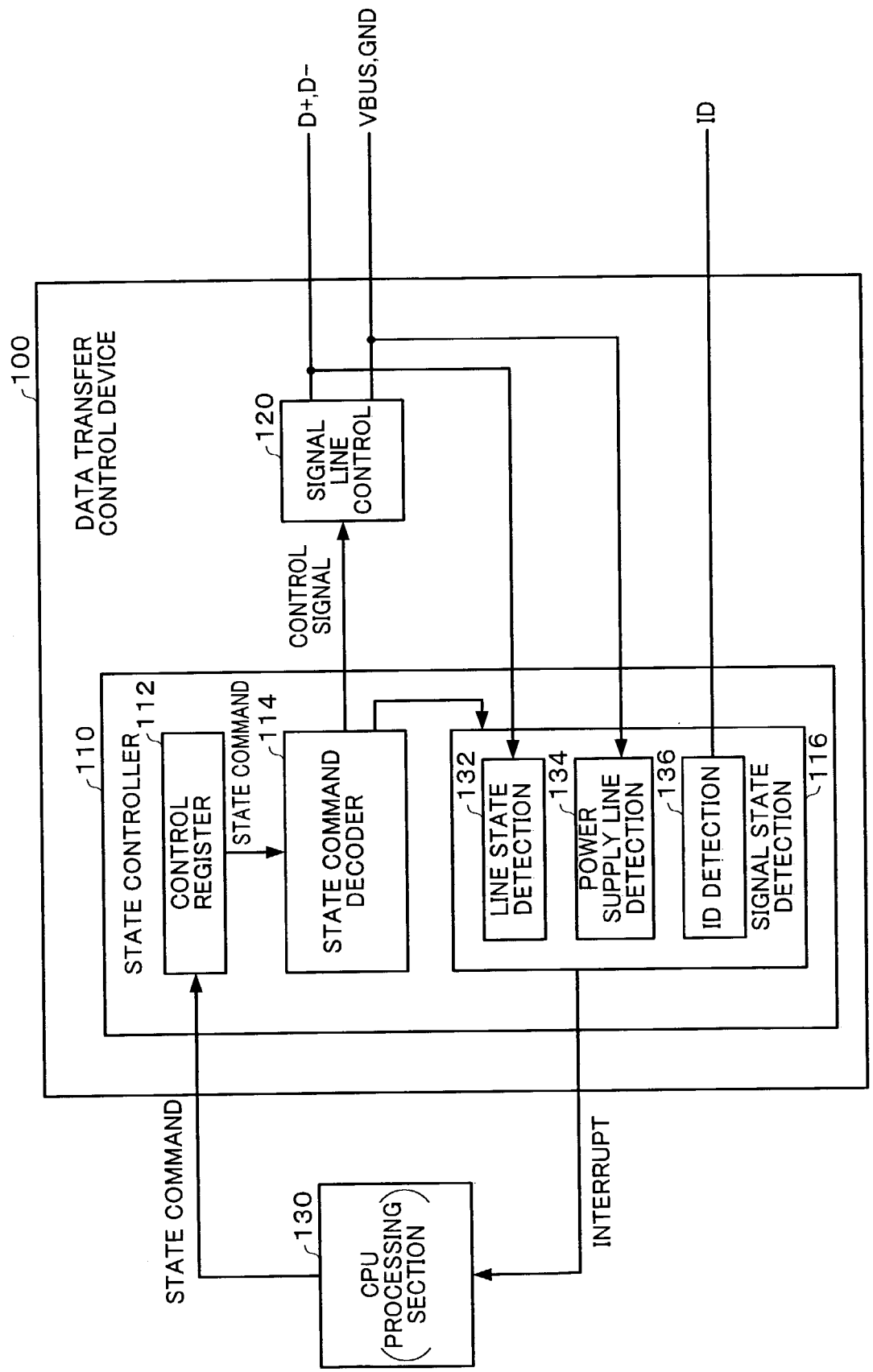
FIG. 7 is a configuration diagram showing a principle configuration of a data transfer control device in an embodiment of the present invention.

FIG. 7 is a principle configuration diagram of a data transfer control device in the present embodiment.

A data transfer control device 100 includes a state controller 110 and a signal line control circuit 120. The state controller 110 generates a control signal corresponding to each state of a transition destination and controls data transfer. The signal line control circuit 120 controls the signal state of at least one of the signal lines consisting of the data signal lines (D+ and D−) (data lines) and the power supply lines (VBUS and GND) based on the control signal.

The data transfer control device 100 may include a host controller (HC) which performs operation control of the host function, or a peripheral controller (PC) which performs operation control of the peripheral function. The operations of the HC and the PC are controlled by the control signal generated by the state controller 110.

The state controller 110 may include a control register 112, a state command decoder 114, and a signal state detection circuit 116. A state command corresponding to a state of a transition destination is set in the control register 112 by a CPU (Central Processing Unit) (processing unit) 130. The state command decoder 114 decodes the state command set in the control register 112 and generates a control signal corresponding to the state of a transition destination. The signal state detection circuit 116 detects whether or not a given condition is satisfied by using detection results for the data signal lines, VBUS, and the ID terminal. The condition to be detected may be changed depending on the state command set in the control register 112 or the results decoded by the state command decoder 114. Specifically, the detection conditions may be changed depending on the state corresponding to the state command set in the control register 112.

The signal state detection circuit 116 includes a line state detection circuit 132, a power supply line detection circuit 134, and an ID detection circuit 136. The line state detection circuit 132 detects the signal states of the data signal lines D+ and D− including a connection state and a disconnection state. This enables the line state ("J" state, "K" state, or "SE0" state) to be detected. The "J" state is a state in which the data signal line D+ is at the "H" level and the data signal line D− is at the "L" level. The "K" state is a state in which the data signal line D+ is at the "L" level and the data signal line D− is at the "H" level. The "SE0" state is a state in which the data signal line D+ is at the "L" level and the data signal line D− is at the "L" level. A state in which both the data signal lines D+ and D− are at the "H" level may also be detected as an "SE1" state. The power supply line detection circuit 134 detects whether or not the voltage of VBUS is above a threshold voltage necessary for detecting initiation and end of a session. The ID detection circuit 136 detects the signal level of the ID terminal. The CPU 130 is notified of the contents detected by at least one of the line state detection circuit 132, the power supply line detection circuit 134, and the ID detection circuit 136 corresponding to the state as an interrupt source of a hardware (H/W) interrupt.

Figure 8:
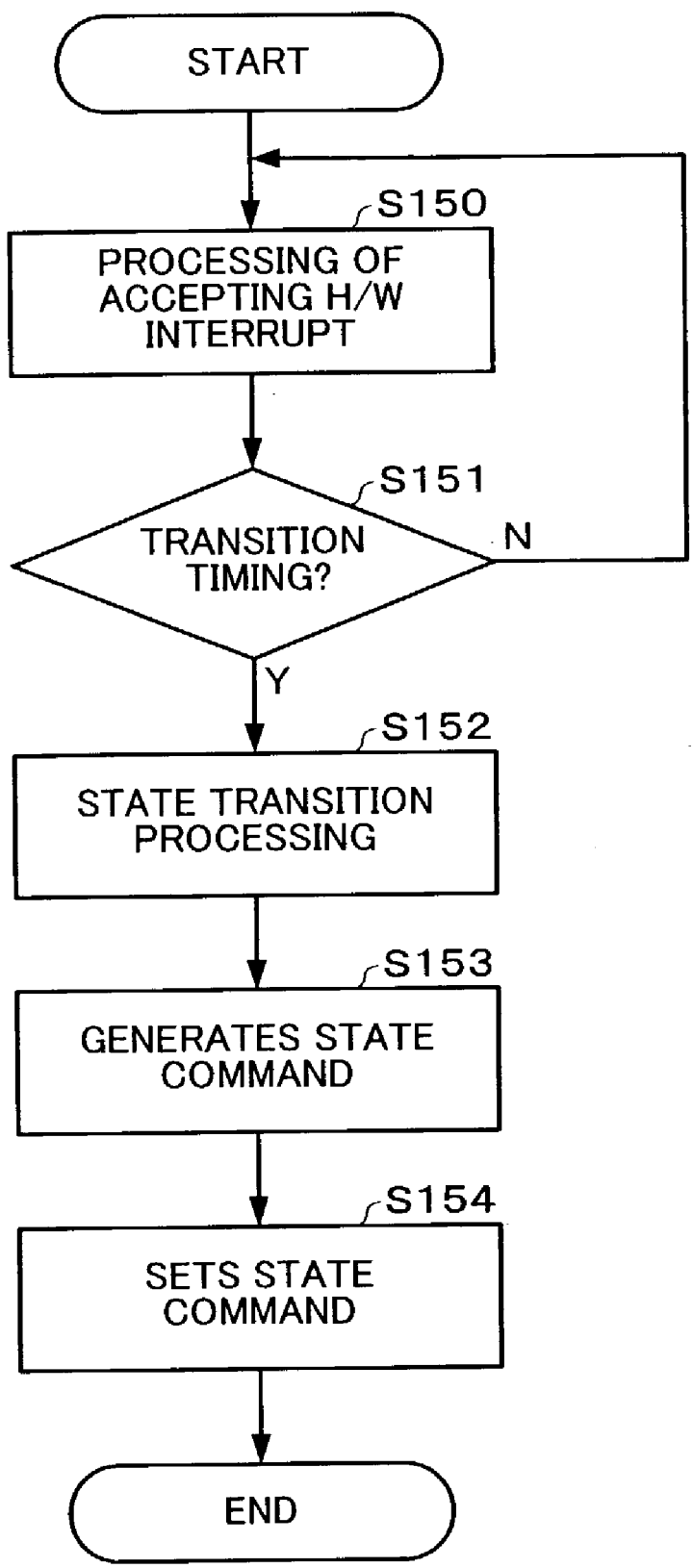
FIG. 8 shows an example of firmware processing in an embodiment of the present invention.

FIG. 8 shows an outline of the contents of state transition control processed by the CPU 130.

The CPU 130 accepts an H/W interrupt and analyzes the interrupt source (step S150). The CPU 130 accepts the H/W interrupt in this state until a given transition timing (step S151: N). The CPU 130 judges a state of a transition destination from the interrupt source accepted in this state at the given transition timing (step S151: Y), and controls transition (step S152).

The CPU 130 generates a state command corresponding to the state of a transition destination and sets the state command in the control register 112 (step S154).

The CPU 130 is capable of controlling state transition based on firmware (software) having the above processing contents.

In the data transfer control device 100 in the present embodiment, state transition is controlled by allowing the CPU 130 to process the firmware, whereby a state of a transition destination is determined. A state command corresponding to the state of a transition destination is set in the state controller 110. The state controller 110 decodes the state command set in the state controller 110 and generates a control signal, whereby control corresponding to each state is realized. The state controller 110 detects a state transition condition processed with the firmware, and notifies the CPU of the state transition condition by an H/W interrupt.

Since it suffices that the state controller 110 merely decode the state command set therein, the CPU 130 does not need to manage the control signal corresponding to the state of the data transfer control device 100.

In the OTG standard, a millisecond timer is necessary for detecting the state transition condition. If a millisecond timer circuit is provided, the circuit scale is increased. In the present embodiment, in the case where it is necessary to measure a time-out period of a millisecond or more in a state corresponding to a given state command, state transition control can be performed while allowing the firmware to execute a timer function in this state. In this case, a control signal necessary for each state can be generated by the state controller 110 by setting the state command corresponding to the state of a transition destination in the state controller 110, whereby state control can be optimized while preventing an increase in circuit scale.

For example, in the a_wait_vrise state (state which is transitioned from an idle state and waits for the voltage of the power supply line to reach a given threshold voltage in a broad sense) shown in FIG. 5, the a_wait_vrise_tmout may be detected by allowing the firmware to set a state command (first state command) corresponding to the state and measure a given time-out period. The a_wait_bcon_tmout may be detected by the firmware in the a_wait_bcon state. The a_aidl_bdis_tmout may be detected by the firmware in the a_suspend state. The b_ase0_brst_tmout may be detected by the firmware in the b_wait_acon state shown in FIG. 6.

2.1 Detailed Configuration of Data Transfer Control Device

A case where the data transfer control device of the present embodiment is applied to an OTG device controller IC is described below.

Figure 9:
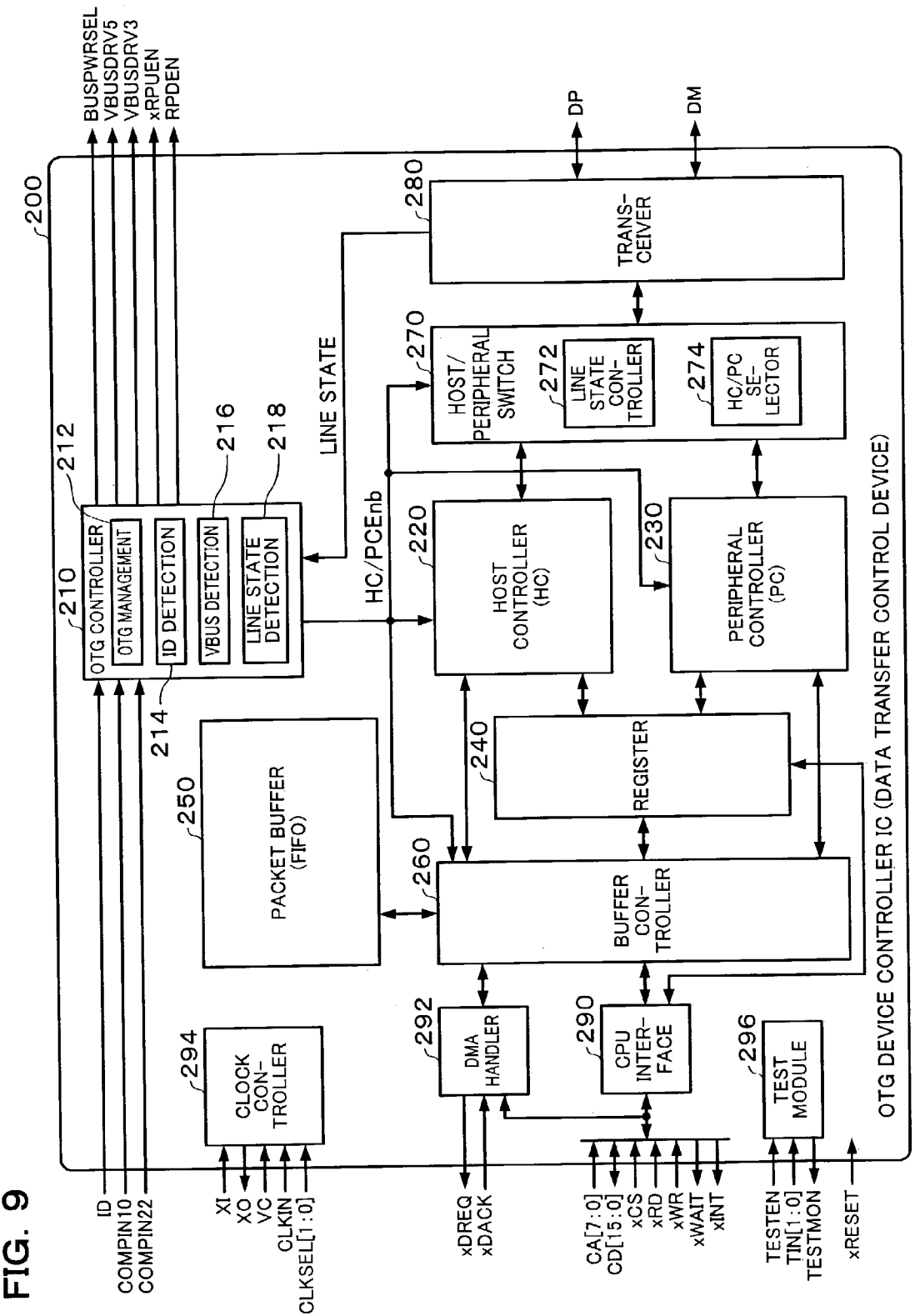
FIG. 9 is a functional block diagram of an OTG device controller IC.

FIG. 9 is a functional block diagram of an OTG device controller IC.

An OTG device controller IC 200 includes an OTG controller 210, an HC 220, a PC 230, a register section 240, a packet buffer 250, a buffer controller 260, a host/peripheral switch circuit 270, a transceiver 280, a CPU interface (I/F) 290, a DMA handler 292, a clock controller 294, and a test module 296.

The OTG controller 210 may include the function of the state controller 110 shown in FIG. 7. The HC 220, the PC 230, the host/peripheral switch circuit 270, and the transceiver 280 may include the function of the signal line control circuit 120 shown in FIG. 7.

The OTG controller 210 generates a control signal corresponding to each state while monitoring the states of the data lines and VBUS, and controls the data lines by controlling switching between the host and the peripheral, for example.

The OTG controller 210 includes an OTG management circuit 212, an ID detection circuit 214, a VBUS detection circuit 216, and a line state detection circuit 218. The OTG management circuit 212 manages an OTG state (each state shown in FIGS. 5 and 6) for functioning as a dual-role device. In more detail, the OTG management circuit 212 generates a control signal corresponding to the OTG state set by the CPU based on an OTG state command corresponding to the OTG state set by the CPU. The ID detection circuit 214 detects the state of the ID terminal as shown in FIG. 2. The VBUS detection circuit 216 detects whether or not the state of VBUS satisfies the detection condition corresponding to the OTG state. The line state detection circuit 218 detects whether or not the line state from the transceiver 280 satisfies the detection condition corresponding to the OTG state.

An ID signal is a signal connected to the ID terminal. The ID detection circuit 214 judges either an A-device or a B-device by the ID signal.

A 1.0 V level detection signal COMPIN10 is a detection signal which indicates whether or not the voltage of VBUS/2 is 1.0 V or more. A 2.2 V level detection signal COMPIN22 is a detection signal which indicates whether or not the voltage of VBUS/2 is 2.2 V or more. The VBUS detection circuit 216 detects whether or not the state of VBUS satisfies the detection condition in a given state by referring to the 1.0 V level detection signal COMPIN10 or the 2.2 V level detection signal COMPIN22.

A VBUS drive signal BUSPWRSEL is an enable signal for switching current to be supplied to VBUS to either 8 mA or 500 mA when using a 5 V power supply. A VBUS drive signal VBUSDRV5 is an enable signal for supplying current to VBUS with a 5 V power supply. A VBUS drive signal VBUSDRV3 is an enable signal for supplying current to VBUS with a 3.3 V power supply. An Rpu enable signal xRPUEN is a pull-up enable signal of the data signal line D+. An Rpd enable signal RPDEN is a pull-down enable signal of the data signal line D+.

The OTG management circuit 212 generates a control signal (VBUS drive signals BUSPWRSEL, VBUSDRV5, and VBUSDRV3, Rpu enable signal xRPUEN, Rpd enable signal RPDEN, HC enable signal HCEnb, PC enable signal PCEnb, etc.) corresponding to the OTG state.

The HC 220 performs operation control of the host function when enabled by the HC enable signal HCEnb from the OTG controller 210. The state control of the HC 220 may be performed by the CPU (firmware). In more detail, the firmware may instruct the HC to generate the USB data line state ("J", "K", or "SE0") in each state by performing state transition of the host using various events (event which indicates transition to the OTG state a_host, for example) as a trigger, and setting an HC state command (Suspend, Reset, Operational, or Resume) corresponding to the state of a transition destination of the host in a given control register. The HC 220 generates a data line state corresponding to the state command set in the given control register. In the case where a time limit (time-out condition) is set in the state, state transition may be controlled by allowing the firmware to measure time. When the HC 220 is enabled in the A-device, the HC 220 performs state transition of the host according to a flowchart shown in FIG. 10. USB transfer is performed in the "Operational" state. When the HC 220 is enabled in the B-device, the HC 220 performs state transition of the host according to a flowchart shown in FIG. 11.

The PC 230 performs operation control of the peripheral function when enabled by the PC enable signal PCEnb from the OTG controller 210. The PC 230 detects Reset, Suspend, or Resume in the case of a peripheral in OTG state transition based on the line state detected by the OTG controller 210 and the like, and notifies the CPU of the detected results by an interrupt. Remote wakeup detection is enabled in the case of a host in OTG state transition. The HC 220 and the PC 230 are enabled exclusively.

The register section 240 is a group of registers for controlling the operations as the host and the peripheral.

The packet buffer 250 is a buffer which stores packets transferred as the host or the peripheral.

The buffer controller 260 manages an access address to the packet buffer 250 which is input or output through the CPU I/F 290 or the DMA handler 292, and manages the access address to the packet buffer 250 which is input or output when performing USB transfer.

The host/peripheral switch circuit 270 includes a line state controller 272 and an HC/PC selector 274. The line state controller 272 instructs the transceiver 280 to generate the signal line state. The HC/PC selector 274 switches a path for connecting the transceiver 280 with either the HC 220 or the PC 230.

The transceiver 280 transmits or receives the USB data signal, generates the USB data line state, and performs parallel/serial conversion, bit stuffing/unstuffing, and the like. The USB positive signal DP is output to the data signal line D+. The USB negative signal DM is output to the data signal line D−.

The CPU I/F 290 controls PIO transfer and generates an interrupt signal to the CPU. CPU address CA[7:0] is a CPU address bus. CPU data CD[15:0] is a CPU data bus and also used as a DMA data bus. A chip select xCS is a chip select signal. A read strobe xRD is a CPU read strobe and is used in common as a DMA read strobe. A write strobe xWR is a CPU write strobe and is used in common as a DMA write strobe. A wait signal xWAIT is a wait signal to the CPU. An interrupt signal xINT is an interrupt signal to the CPU.

The DMA handler 292 controls DMA transfer. A DMA request xDREQ is a DMA transfer request signal. A DMA acknowledge xDACK is a DMA transfer enable signal.

The clock controller 294 distributes and controls a clock signal supplied to each of the above-described blocks. The clock controller 294 generates a clock signal by multiplying an oscillation output using an oscillator connected with an oscillator input XI and an oscillator output XO by means of a PLL circuit. A PLL filter circuit is connected with a PLL filter VC. The clock controller 294 is capable of selecting either a clock signal from an external clock input CLKIN or a clock signal using the oscillator by a clock select signal CLKSEL [1:0].

A test module 296 is a module for performing an operability test of each section of the OTG device controller IC 200. The test module 296 performs a test in a test mode selected by a test mode TIN [1:0] when enabled by a test enable TEST, and monitors an internal test through a test monitor TESTMON.

In the OTG device controller IC 200 having such a configuration, the CPU is notified of the transition condition detected by the OTG controller 210 as an interrupt signal through the CPU I/F 290, and the CPU (firmware) controls state transition. An OTG state command corresponding to a destination OTG state is set in the OTG controller 210 through the CPU interface 290. The OTG controller 210 generates a control signal corresponding to the OTG state command set therein and controls each block. Specifically, transition between each state is controlled by the firmware. The H/W interrupt signal or instructions from the host application (software) is the state transition condition.

Figure 10:
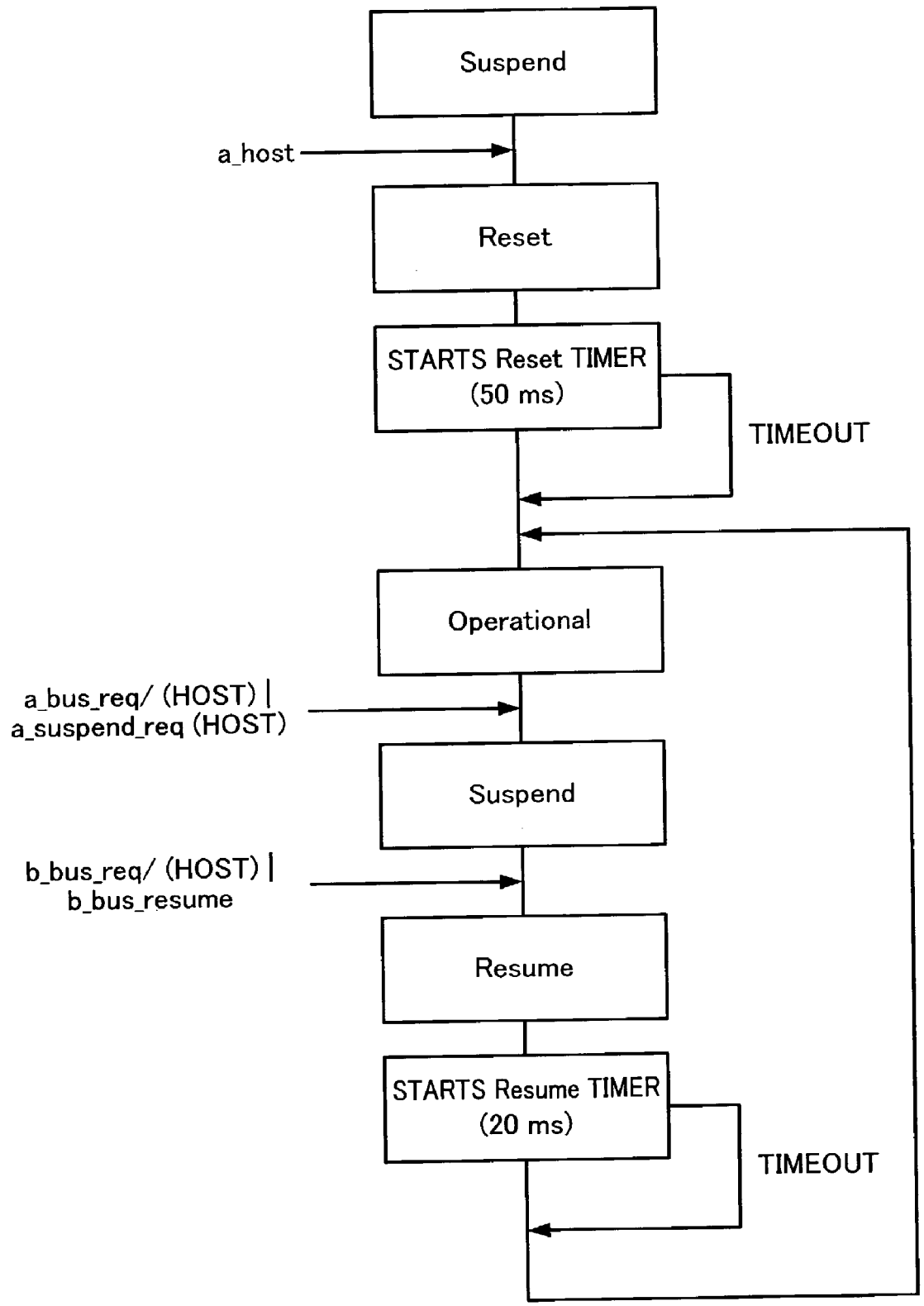
FIG. 10 is a flowchart showing an example of state transition performed by an HC when an OTG device controller IC is an A-device.
Figure 11:
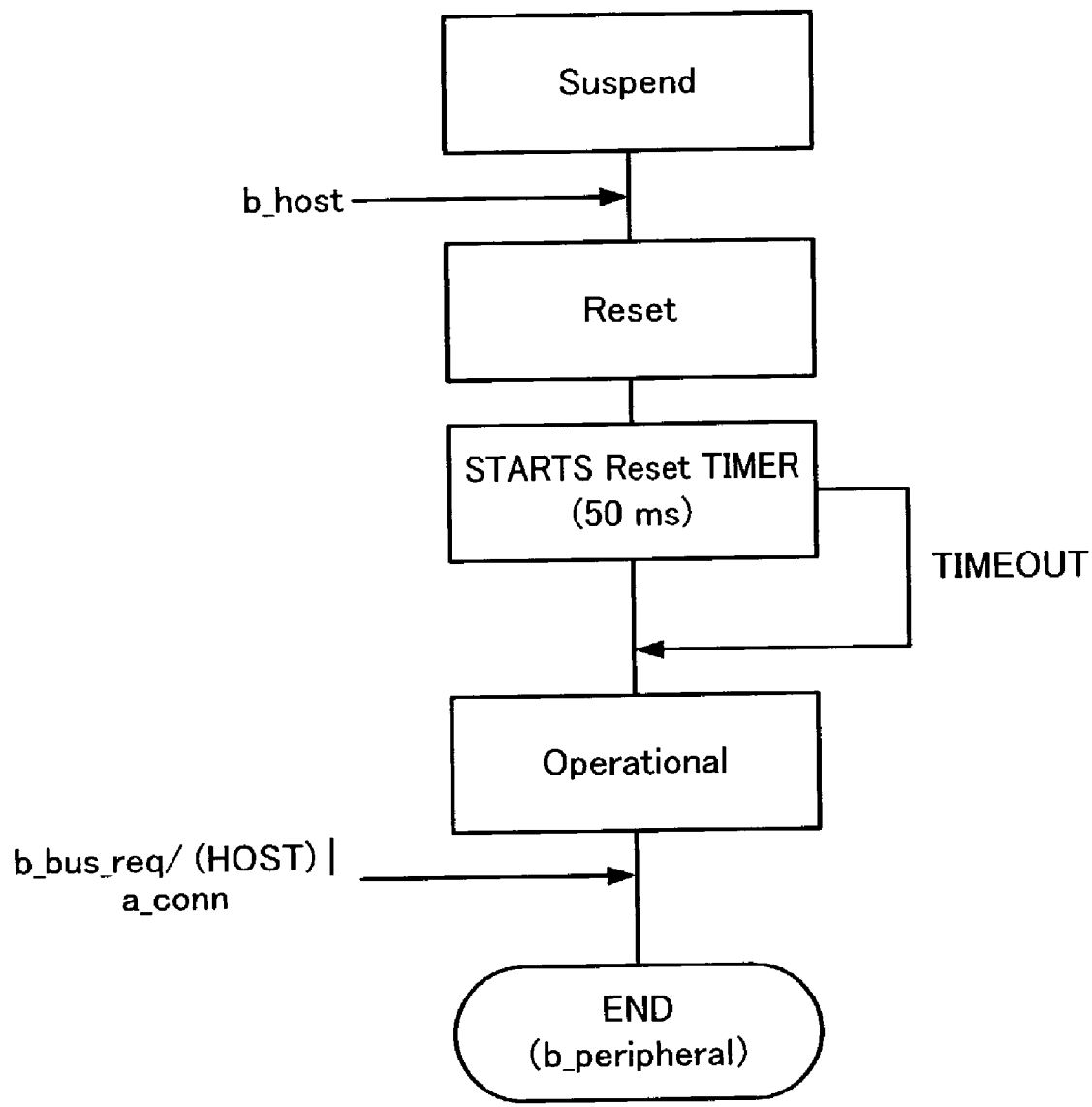
FIG. 11 is a flowchart showing an example of state transition performed by an HC when an OTG device controller IC is a B-device.

In the case of allowing the HC 220 to control transition between each state for performing the host function, state transition can be controlled in the same manner as described above. In more detail, as shown in FIGS. 10 and 11, state transition of the HC state is controlled by the firmware, and the HC 220 in which the HC state command corresponding to the destination HC state is set controls the host by a control signal corresponding to the HC state command.

Figure 12:
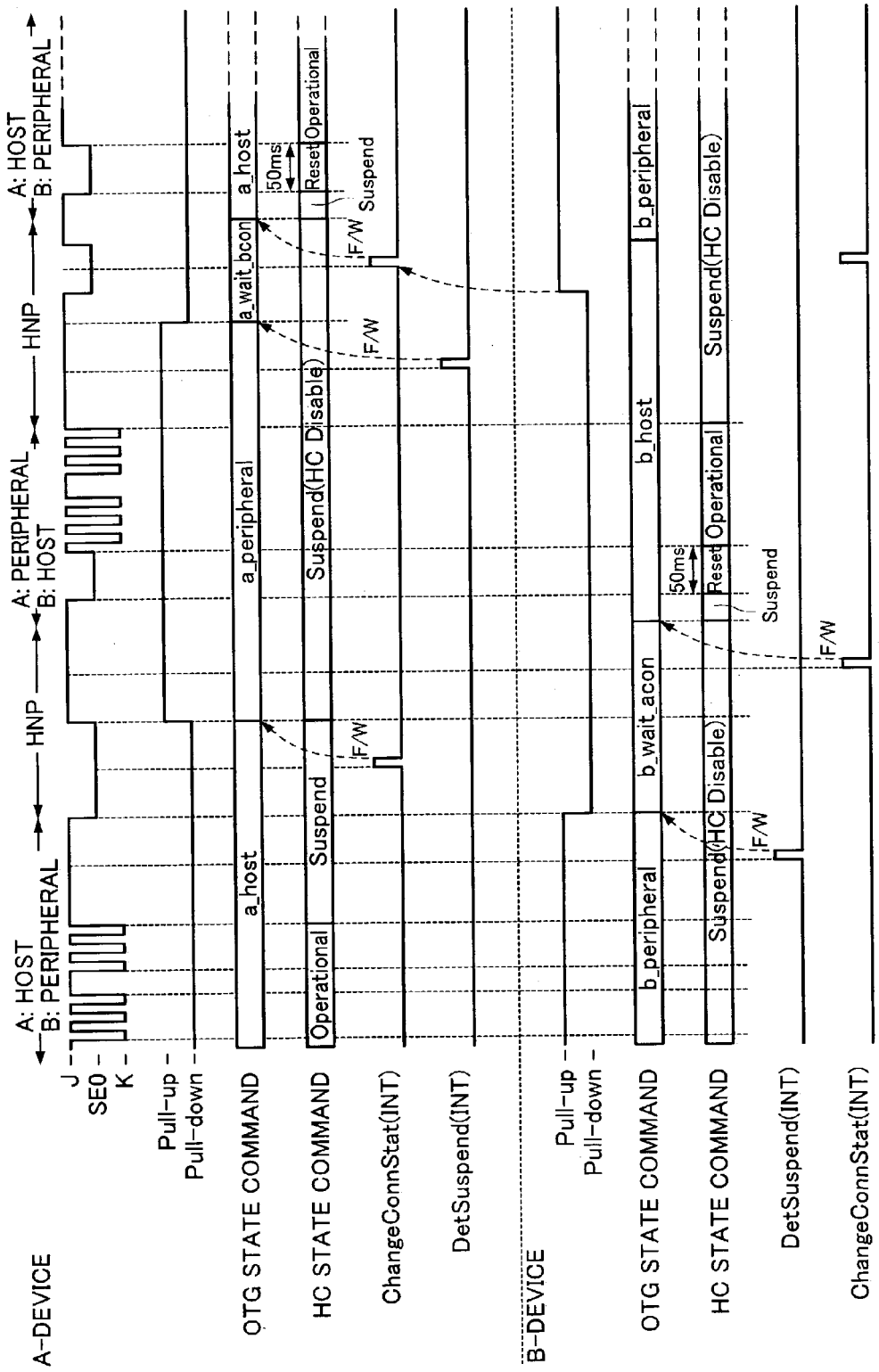
FIG. 12 is a timing chart showing an example of HNP operation timing by an OTG device controller IC.

This enables the operation as the dual-role device to be realized while exchanging the host function and the peripheral function by HNP, as shown in FIG. 12. In FIG. 12, the firmware controls the operation of the dual-role device by setting the OTG state command and the HC state command by an interrupt signal.

2.2 OTG Controller

Figure 13:
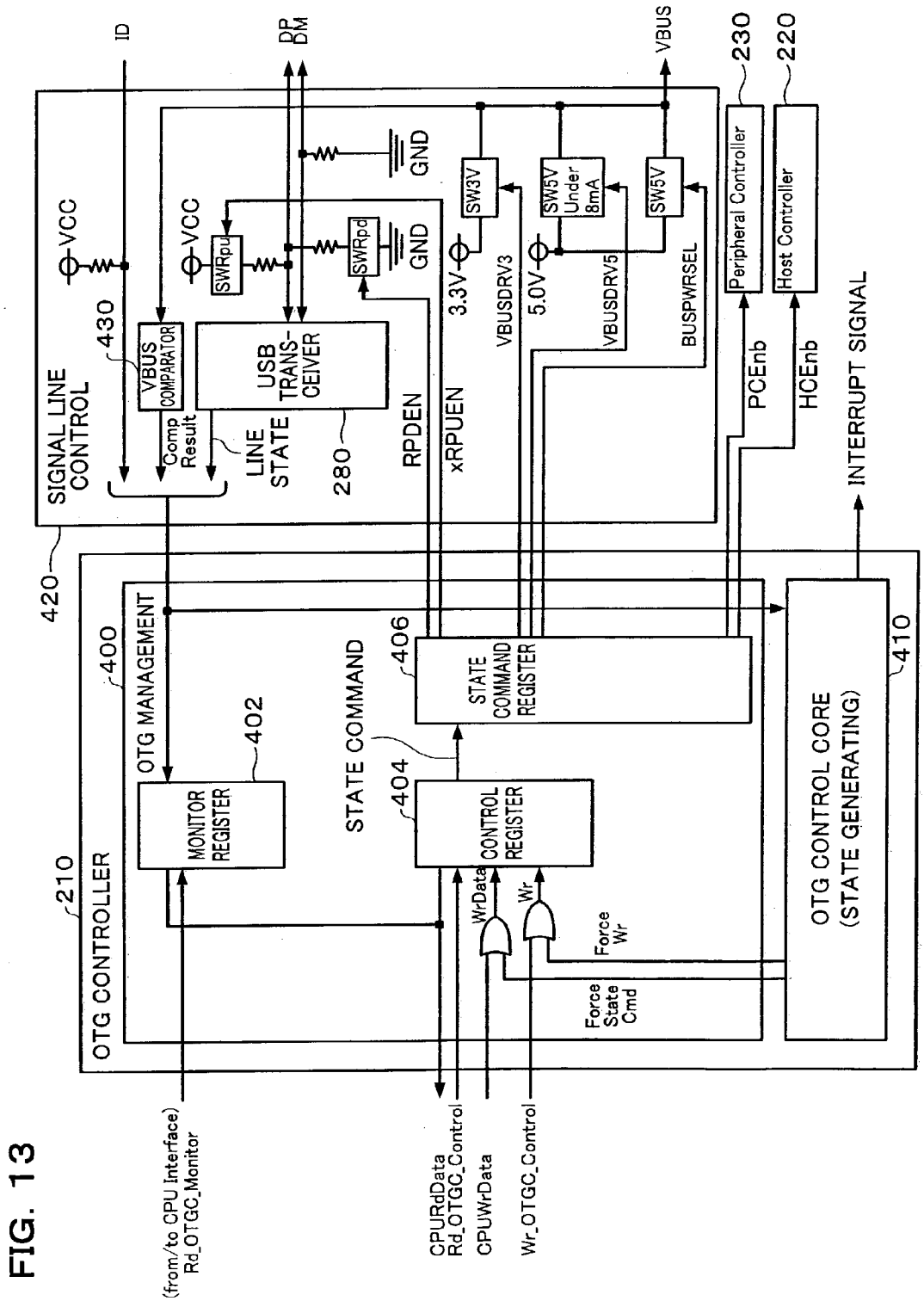
FIG. 13 is a configuration diagram showing a specific configuration example of an OTG controller of an OTG device controller IC.

FIG. 13 shows an example of a configuration of the OTG controller of the OTG device controller IC shown in FIG. 9.

The OTG controller 210 includes an OTG management circuit 400 and an OTG control core circuit 410. The OTG management circuit 400 includes a monitor register 402, a control register 404, and a state command decoder 406. The OTG control core circuit 410 has the same function as the ID detection circuit 214, the VBUS detection circuit 216, and the line state detection circuit 218 shown in FIG. 9, and notifies the CPU of the condition detected corresponding to the state as an interrupt signal.

In the monitor register 402, LSConnect which indicates whether or not an LS (Low Speed) device is connected, ID which indicates the state of the ID terminal, LineState [1:0] which indicates the line state ("J" state, "K" state, "SE0" state, or "SE1" state) of the data signal lines, Comp20V which indicates 2.0 V comparator output results, and Comp44V which indicates 4.4 V comparator output results are set in bit fields shown in FIG. 14. The values set in the monitor register 402 are read from the CPU.

In the control register 404, AllowRmtWkuP for enabling/disabling detection of a remote wakeup signal, BusPwrSel for setting allowable current of VBUS to either 8 mA or another, and OTGStateCmd [3:0] in which the OTG state command is set are set in bit fields shown in FIG. 14. The values set in the control register 404 can be read or written from the CPU. The control register 404 can be directly set by the OTG control core circuit 410. In this case, the OTG control core circuit 410 generates a state command corresponding to a state of a transition destination as a state generating circuit by monitoring the line state, voltage of VBUS, and the like, and sets the state command in the control register 404. In the case of allowing a state to transition from the a_suspend state (suspend state in abroad sense) to the a_host state (state which starts data transfer in a broad sense) as shown in FIG. 5, the OTG control core circuit 410 may generate a state command corresponding to the a_host state by detecting b_bus_resume by hardware.

This enables state transition which cannot be dealt with in time by firmware processing to be controlled by hardware. In order to simplify control by maintaining consistency of state transition control, it is preferable to allow the firmware to perform state transition by using the same transition condition and to set the state command corresponding to the same state of a transition destination after setting by the hardware.

The state command decoder 406 generates a control signal such as RPDEN, xRPUEN, VBUSDRV3, VBUSDRV5, BUSPWRSEL, PCEnb, and HCEnb based on OTGStateCmd [3:0] set in the control register 404.

The signal line control circuit 420 includes the transceiver 280 shown in FIG. 9. The VBUS comparator 430 may be provided outside the OTG device controller IC 200.

Figure 15:
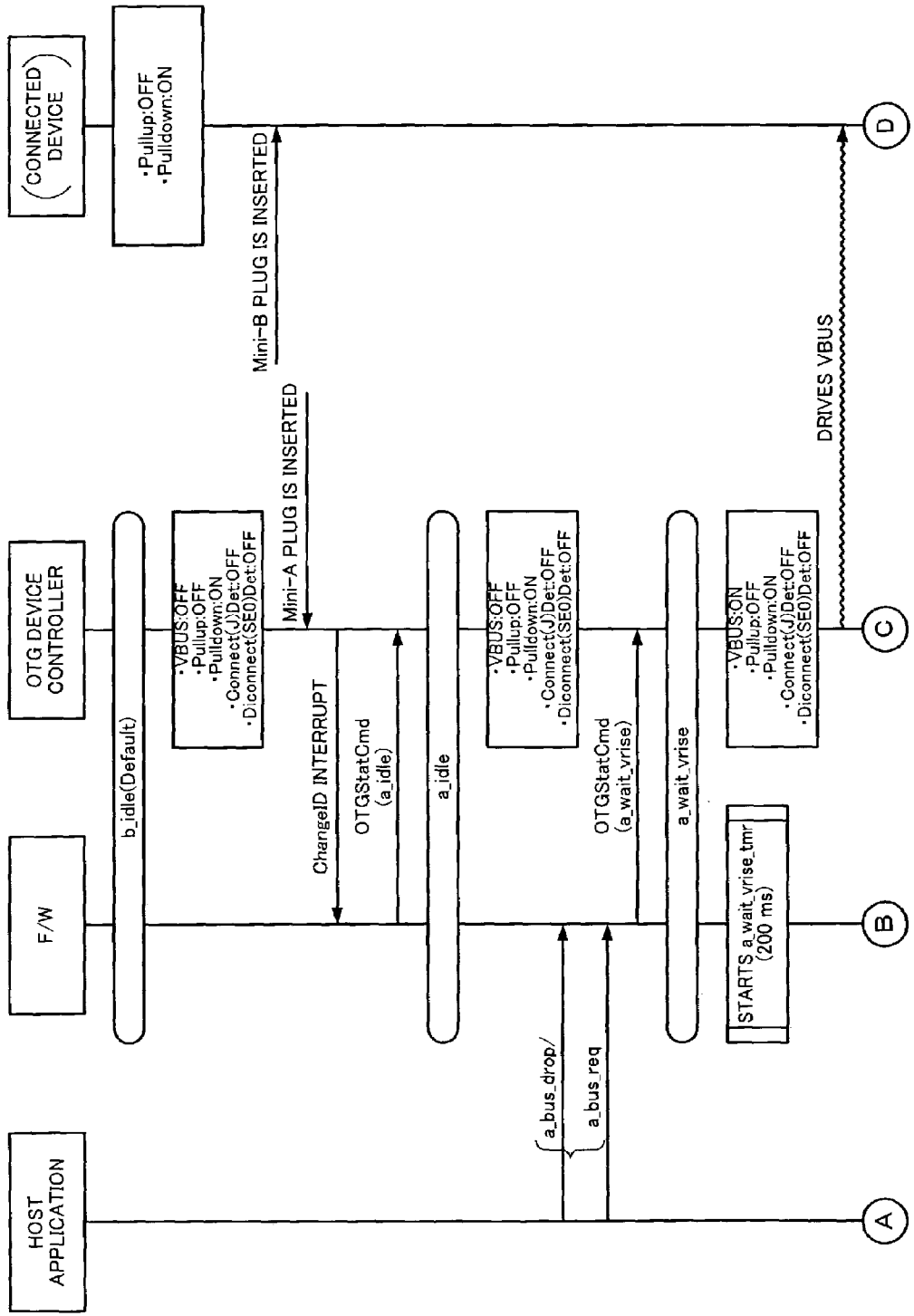
FIG. 15 is a view showing the first half of an example of a sequence of an OTG device controller IC.
Figure 16:
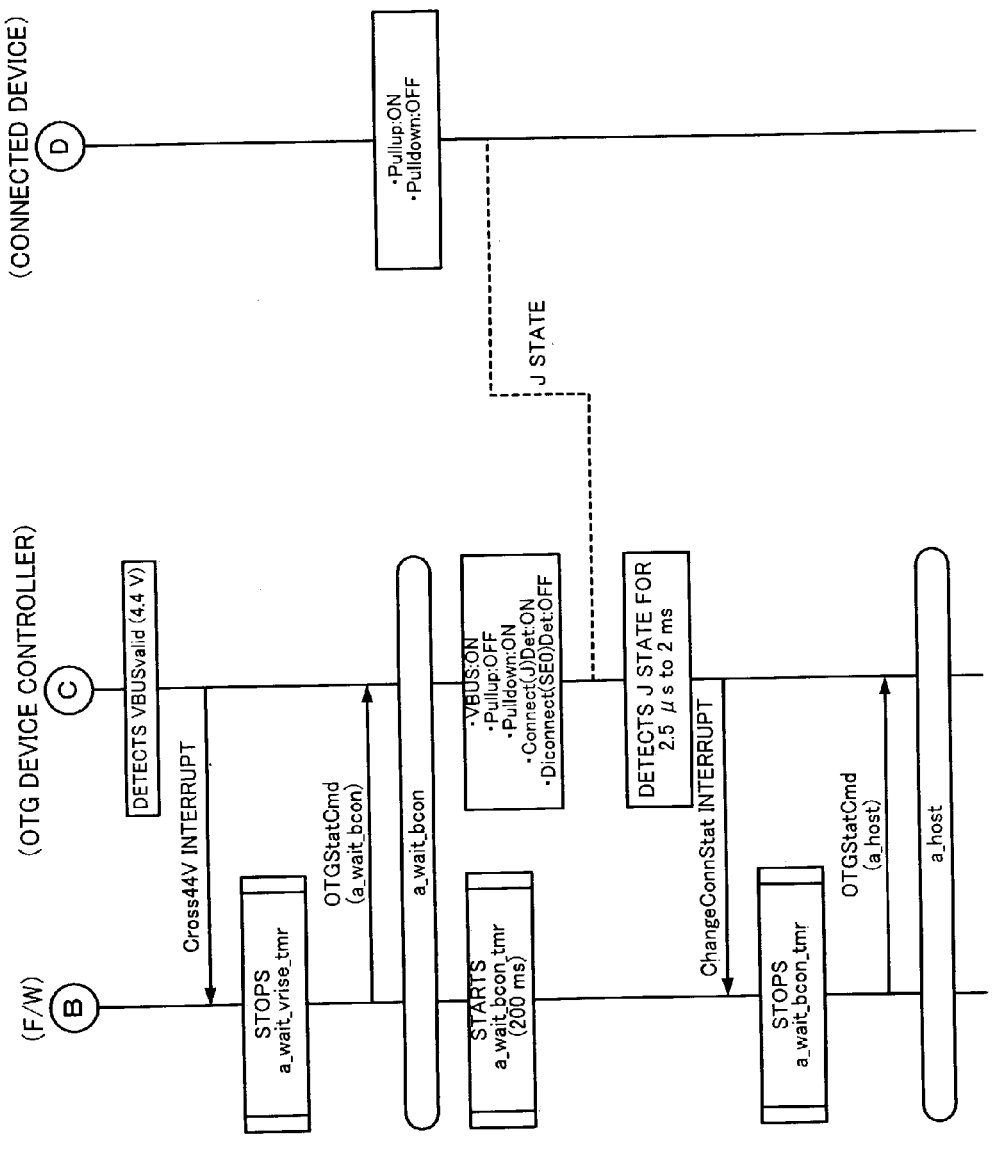
FIG. 16 is a view showing the latter half of an example of a sequence of an OTG device controller IC.

FIGS. 15 and 16 show an example of data transfer control using the OTG device controller IC 200.

FIGS. 15 and 16 illustrate firmware processing and communication with a connected device performed when the A-device transitions from the b_idle state (default) to the a_host state.

Connect(J)Det refers to a function of detecting that the line state is in the "J" state in order to detect connection with the connected device. Disconnect(SE0)Det refers to a function of detecting that the line state is in the "SE0" state in order to detect disconnection from the connected device.

Figure 17:
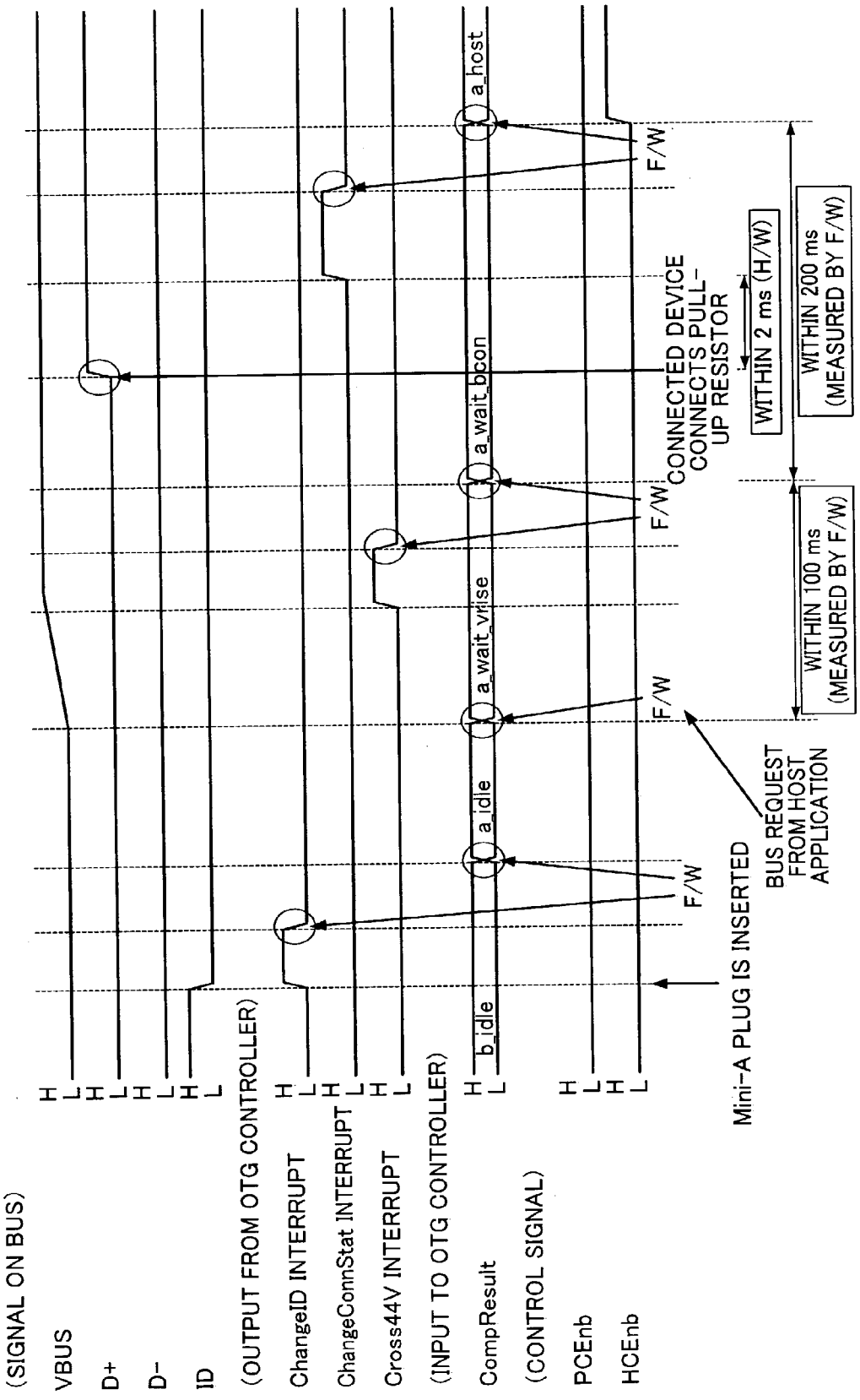
FIG. 17 is a timing chart showing an example of an operation of an OTG device controller IC.

FIG. 17 shows an example of a timing chart of signals on the bus when the A-device transitions from the b_idle state (default) to the a_host state.

The dual-role device is in the b_idle state by default as described above.

When a Mini-B plug is inserted into the connected device and a Mini-A plug is inserted into the OTG device controller IC 200, the CPU (firmware) is notified of a ChnageID interrupt which indicates that the ID signal is changed. The interrupt signal of which the CPU is notified is controlled to be deactivated by the CPU.

The CPU judges that the state of a transition destination is the a_idle state as shown in FIG. 5, and sets the OTG state command. Therefore, each block in the OTG device controller IC 200 is controlled based on the control signal in the a_idle state.

When the host application requests use of the bus (a_bus_req), the CPU judges that the state of a transition destination is the a_wait_vrise state and sets the OTG state command.

When the state command corresponding to the a_wait_vrise state (first state command) is set and a state transitions to the a_wait_vrise state, the CPU starts a 200-ms timer. When the voltage of VBUS is detected to rise above the given threshold voltage, the CPU terminates the timer in the a_wait_vrise state by the Cross44V interrupt, judges that the state of a transition destination is the a_wait bcon state, and sets the OTG state command. In the case where the timer has timed out (200 ms has elapsed), the CPU also judges that the state of a transition destination is the a_wait bcon state and sets the OTG state command corresponding to the a_wait_bcon state.

When the state transitions to the a_wait_bcon state, the CPU starts a 200-ms timer. When the line state is detected to be in the "J" state for a predetermined period of time, the CPU terminates the timer by the ChangeConnStat interrupt, judges that the state of a transition destination is the a_host state, and sets the OTG state command.

State transition is performed thereafter in the same manner as described above.

3. Electronic Equipment

Figure 18A:
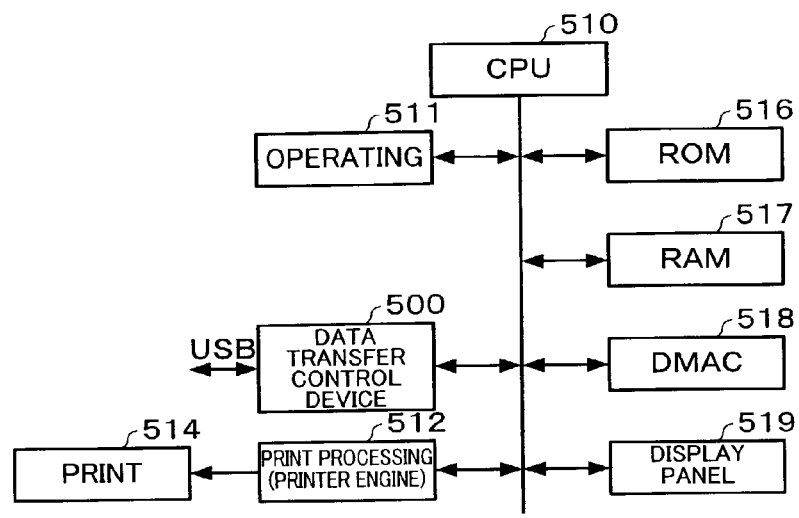
FIGS. 18A, 18B, and 18C show examples of internal block diagrams of various types of electronic equipment.
Figure 19A:
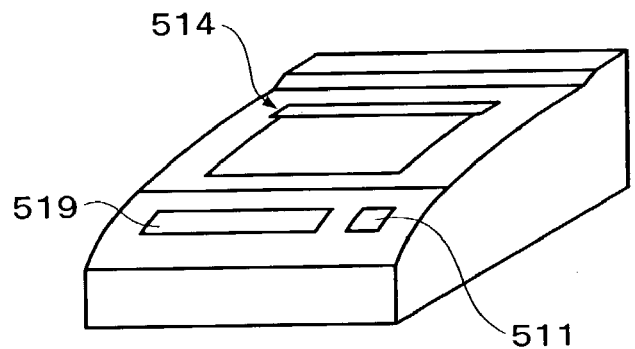
FIGS. 19A, 19B, and 19C show examples of external views of various types of electronic equipment.

Examples of electronic equipment including the data transfer control device of the present embodiment are described below. FIG. 18A is an internal block diagram of a printer which is an example of electronic equipment. FIG. 19A is an external view of the printer. A CPU (microcomputer) 510 controls the entire system and the like. An operating section 511 allows the user to operate the printer. A control program, fonts, and the like are stored in a ROM 516. A RAM 517 functions as a work area for the CPU 510. A DMAC 518 is a DMA controller for transferring data without the CPU 510. A display panel 519 notifies the user of the operation state of the printer.

Serial print data sent from another device such as a personal computer through the USB is converted into parallel print data by a data transfer control device 500. The converted parallel print data is sent to a print processing section (printer engine) 512 by the CPU 510 or the DMAC 518. The parallel print data is subjected to given processing in the print processing section 512 and output and printed on paper by a print section (device which performs output processing of data) 514 consisting of a print head and the like.

Figure 18B:
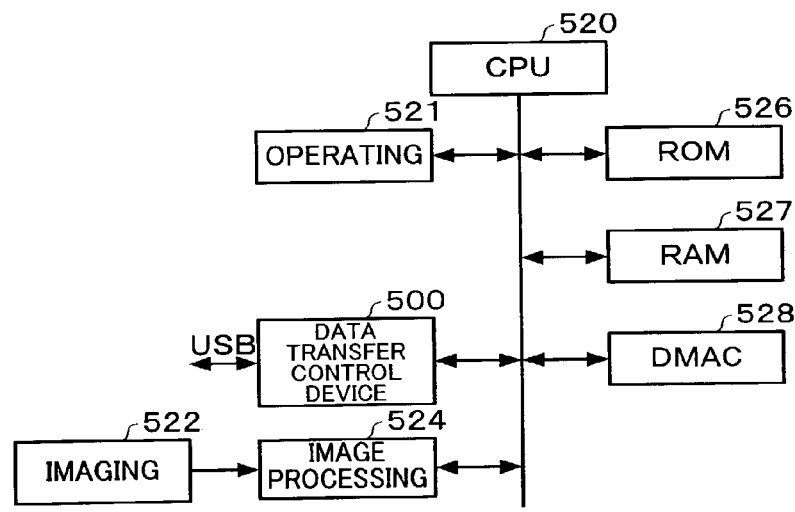
Figure 19B:
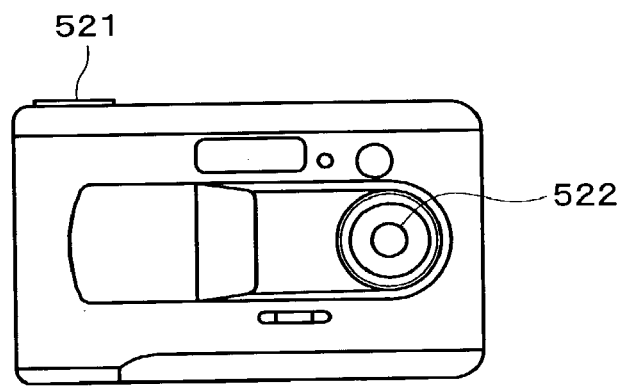

FIG. 18B shows an internal block diagram of a digital camera which is another example of electronic equipment. FIG. 19B is an external view of the digital camera. A CPU 520 controls the entire system and the like. An operating section 521 allows the user to operate the digital camera. A control program and the like are stored in a ROM 526. A RAM 527 functions as a work area for the CPU 520. A DMAC 528 is a DMA controller.

An image of an object is taken by an imaging section 522 consisting of a CCD and the like. The image data is processed by an image processing section 524. The processed image data is sent to the data transfer control device 500 by the CPU 520 or the DMAC 528. The data transfer control device 500 converts the parallel image data into serial data and sends the serial data to another device such as a personal computer through the USB.

Figure 18C:
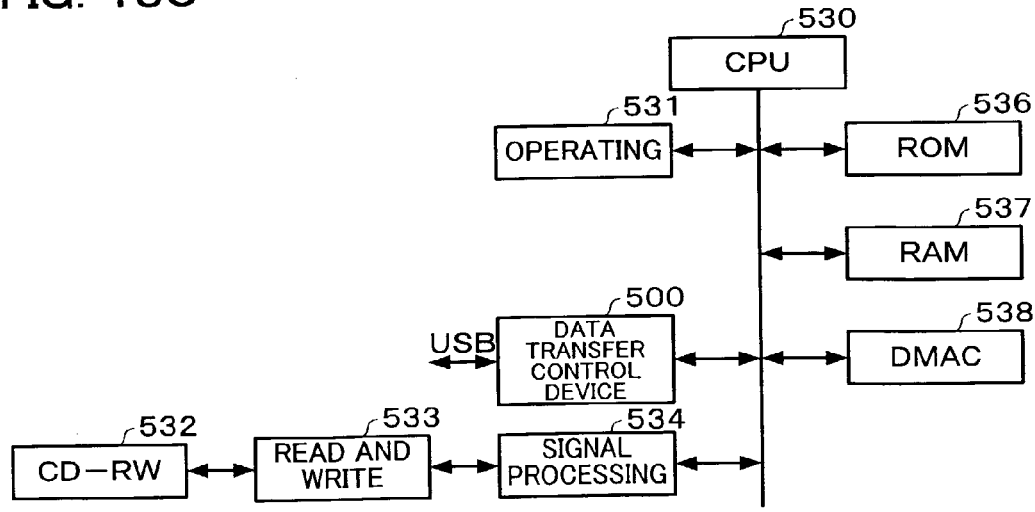
Figure 19C:
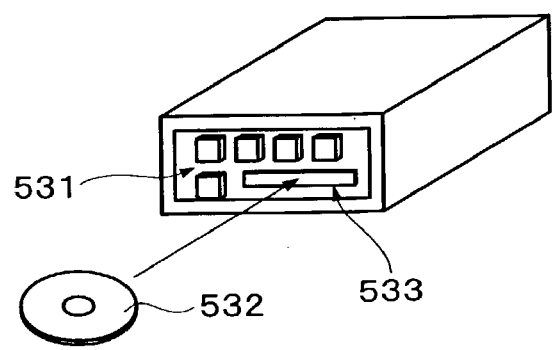

FIG. 18C is an internal block diagram of a CD-RW drive which is still another example of electronic equipment. FIG. 19C is an external view of the CD-RW drive. A CPU 530 controls the entire system and the like. An operating section 531 allows the user to operate the CD-RW. A control program and the like are stored in a ROM 536. A RAM 537 functions as a work area for the CPU 530. A DMAC 538 is a DMA controller.

Data read from a CD-RW 532 by a read/write section (device which performs fetch processing or storage processing of data) 533 consisting of a laser, motor, optical system, and the like is input to a signal processing section 534 and subjected to given signal processing such as error correction processing. The data subjected to the signal processing is sent to the data transfer control device 500 by the CPU 530 or the DMAC 538. The data transfer control device 500 converts the parallel data into serial data and sends the serial data to another device such as a personal computer through the USB.

Serial data sent from another device through the USB is converted into parallel data by the data transfer control device 500. The parallel data is sent to the signal processing section 534 by the CPU 530 or the DMAC 538. The parallel data is subjected to given signal processing in the signal processing section 534 and stored on the CD-RW 532 by the read/write section 533.

In FIGS. 18A, 18B, and 18C, another CPU for controlling data transfer by the data transfer control device 500 may be provided in addition to the CPU 510, 520 or 530.

USB transfer can be performed without connecting the electronic equipment with a personal computer which performs the host operation by providing the data transfer control device of the present embodiment in electronic equipment. In particular, it is unnecessary for the user to carry a personal computer by providing the data transfer control device in portable electronic equipment, whereby USB transfer can be readily performed. For example, USB transfer can be performed between a printer or a CD-RW without using a personal computer.

A processing load of firmware which operates on the CPU is reduced by providing the data transfer control device of the present embodiment in electronic equipment, whereby an inexpensive CPU can be used. Moreover, since cost and scale of the data transfer control device can be reduced, cost and scale of the electronic equipment can also be reduced.

As other examples of electronic equipment to which the data transfer control device of the present embodiment can be applied, various types of optical disk drives (CD-ROM and DVD), magneto-optical disk drives (MO), hard disk drives, TVs, VTRs, video cameras, audio equipment, telephones, projectors, personal computers, electronic notebooks, word processors, and the like can be given.

The present invention is not limited to the present embodiment. Various modifications and variations are possible within the spirit and scope of the present invention.

The present invention is particularly preferably applied to data transfer according to the OTG standard. However, the application of the present invention is not limited thereto. For example, the present invention may be applied to data transfer in a standard based on the same idea as the OTG standard and a standard developed from the OTG standard.

The above embodiment illustrates a case where a device into which a Mini-A plug is inserted before transfer is an A-device and a device into which a Mini-B plug is inserted is a B-device. However, the present invention may also be applied to a case where the supply source of VBUS is changed by exchanging the A-device and the B-device during transfer control.

What is claimed is:

1. A data transfer control device including a controller which performs operation control of a host function and a peripheral function by transitioning between a plurality of states, the data transfer control device comprising:
a control register in which a state command corresponding to each state for controlling the controller is set;
a signal state detection circuit which detects a signal state of at least one of data lines and power supply line; and
a state command decoder which decodes the state command and generates a control signal which controls the signal state of at least one of the data lines and power supply line,
wherein a state command corresponding to a state of a transition destination generated by a given processing section based on a result detected by the signal state detection circuit is set in the control register.

2. The data transfer control device as defined in claim 1, wherein the given processing section starts counting a given time-out period in a state corresponding to a first state command set in the control register, and sets a state command corresponding to a state transitioning corresponding to a result detected by the signal state detection circuit in the control register when the given time-out period has elapsed.

3. The data transfer control device as defined in claim 2, wherein the first state command is a state command corresponding to a state which is transitioned from an idle state and waits until voltage of the power supply line reaches a given threshold voltage.

4. The data transfer control device as defined in claim 1, wherein the signal state detection circuit includes:
a data line detection circuit which detects the signal state of the data lines; and
a power supply line detection circuit which detects the signal state of the power supply line, and
wherein at least one of the data line detection circuit and the power supply line detection circuit may change the signal state to be detected depending on the state command set in the control register.

5. The data transfer control device as defined in claim 1, further comprising:
a state generating circuit which generates a state command corresponding to a state next to a state corresponding to a state command set in the control register,
wherein a state command corresponding to a state of the transition destination generated by the given processing section or a state command generated by the state generating circuit is set in the control register.

6. The data transfer control device as defined in claim 2, further comprising:
a state generating circuit which generates a state command corresponding to a state next to a state corresponding to a state command set in the control register,
wherein a state command corresponding to a state of the transition destination generated by the given processing section or a state command generated by the state generating circuit is set in the control register.

7. The data transfer control device as defined in claim 3, further comprising:
a state generating circuit which generates a state command corresponding to a state next to a state corresponding to a state command set in the control register,
wherein a state command corresponding to a state of the transition destination generated by the given processing section or a state command generated by the state generating circuit is set in the control register.

8. The data transfer control device as defined in claim 4, further comprising:
a state generating circuit which generates a state command corresponding to a state next to a state corresponding to a state command set in the control register,
wherein a state command corresponding to a state of the transition destination generated by the given processing section or a state command generated by the state generating circuit is set in the control register.

9. The data transfer control device as defined in claim 5, wherein the state generating circuit generates a state command corresponding to a state which is transitioned from a suspend state and starts data transfer.

10. The data transfer control device as defined in claim 6, wherein the state generating circuit generates a state command corresponding to a state which is transitioned from a suspend state and starts data transfer.

11. The data transfer control device as defined in claim 7, wherein the state generating circuit generates a state command corresponding to a state which is transitioned from a suspend state and starts data transfer.

12. The data transfer control device as defined in claim 8, wherein the state generating circuit generates a state command corresponding to a state which is transitioned from a suspend state and starts data transfer.

13. The data transfer control device as defined in claim 1, wherein the controller controls switching between the host function and the peripheral function according to the Universal Serial Bus (USB) On-The-Go (OTG) standard.

14. Electronic equipment comprising:
the data transfer control device as defined in claim 1; and
a device which performs output processing, fetch processing, or storage processing of data transferred through the data transfer control device and a bus.

15. A data transfer control method for a controller which performs operation control of a host function and a peripheral function by transitioning between a plurality of states, the data transfer control method comprising:
detecting a signal state of at least one of data lines and power supply line
allowing a given processing section to judge a state of a transition destination based on a result detected for the signal state and to set a state command corresponding to the state of the transition destination; and
controlling the signal state of at least one of the data lines and the power supply line based on the state command,
the given processing section starting counting a given time-out period in a state corresponding to a first state command, and allowing transition to a state corresponding to the result detected for the signal state when the given time-out period has elapsed.

16. The data transfer control method as defined in claim 15,
the first state command being a state command corresponding to a state which is transitioned from an idle state and waiting until voltage of the power supply line reaches a given threshold voltage.

17. The data transfer control method as defined in claim 15,
wherein the signal state to be detected of at least one of the data lines and power supply line is changed according to the state command.

18. The data transfer control method as defined in claim 15,
wherein the controller controls switching between the host function and the peripheral function according to the Universal Serial Bus (USB) On-The-Go (OTG) standard.

* * * * *